United States Patent [19]

Stewart et al.

[11] 4,244,279
[45] Jan. 13, 1981

[54] HYDROSTATIC TRANSMISSION LUBRICATION

[75] Inventors: Max E. Stewart, Indianapolis; James R. Lucas, Carmel, both of Ind.

[73] Assignee: General Motors Corporation, Detroit, Mich.

[21] Appl. No.: 51,110

[22] Filed: Jun. 22, 1979

[51] Int. Cl.³ .......................... F01B 1/06; F01B 13/06
[52] U.S. Cl. ...................................... 91/488; 60/456; 60/487; 91/490; 92/58; 92/158
[58] Field of Search ................. 60/403, 445, 451, 452, 60/487; 74/687; 91/490, 491, 492, 488; 92/158, 159, 58

[56] References Cited

U.S. PATENT DOCUMENTS

| | | | |
|---|---|---|---|
| 3,274,946 | 9/1966 | Simmons | 91/490 |
| 3,373,636 | 3/1968 | Livezey et al. | 74/720.5 |
| 3,640,157 | 2/1972 | Schaefer | 74/869 |
| 3,752,010 | 8/1973 | Tipping | 74/687 |
| 3,982,448 | 9/1976 | Polak et al. | 74/687 |

Primary Examiner—Irwin C. Cohen
Attorney, Agent, or Firm—A. M. Heiter

[57] ABSTRACT

A hydrostatic transmission having a pump and a motor of the radial piston type with each cylinder slipper bearing rotatably supported by a hybrid or combination hydrostatic and hydrodynamic bearing on an internal bearing. The hydrostatic bearing component has a restricted port connecting hydrostatic pressure fluid from the cylinder to supply a distribution recess in the slipper bearing surface for hydrostatic pressure feed of the fluid film providing hydrostatic balancing pressure gradient between the slipper and internal bearing to balance a high percentage of the hydrostatic pressure load and to meet flow requirements for low speed operation. The hydrodynamic bearing component has a low pressure source to spray fluid on the internal bearing, annular dams on each side retaining fluid on the internal bearing, and a taper at the leading edge of the slipper bearing to force fluid into the bearing clearance and provide a hydrodynamic balancing pressure component and fluid flow increasing with speed to balance the centrifugal load and effect balancing of the remaining hydrostatic load and to meet flow requirements which increase with speed. The total hydrostatic and hydrodynamic balancing pressure balances the total load.

12 Claims, 12 Drawing Figures

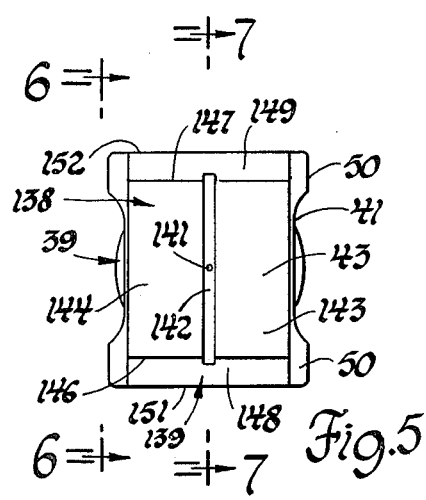
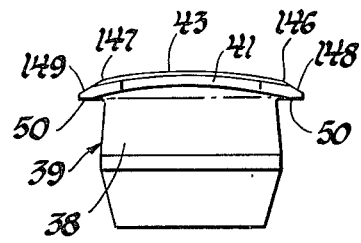
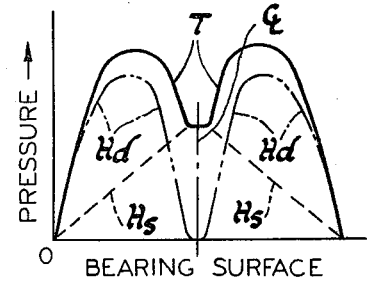
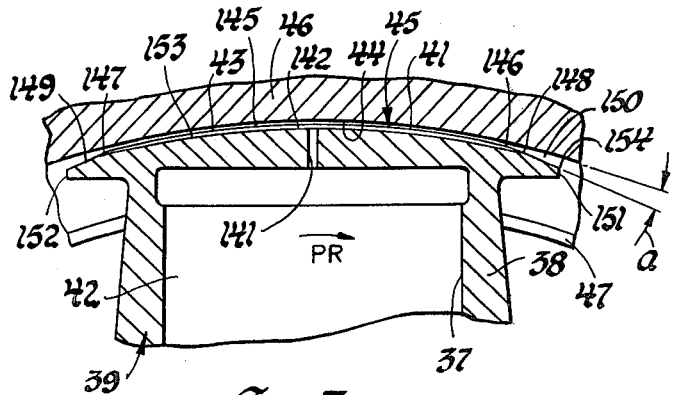
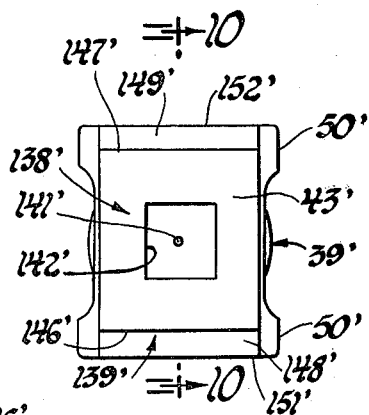
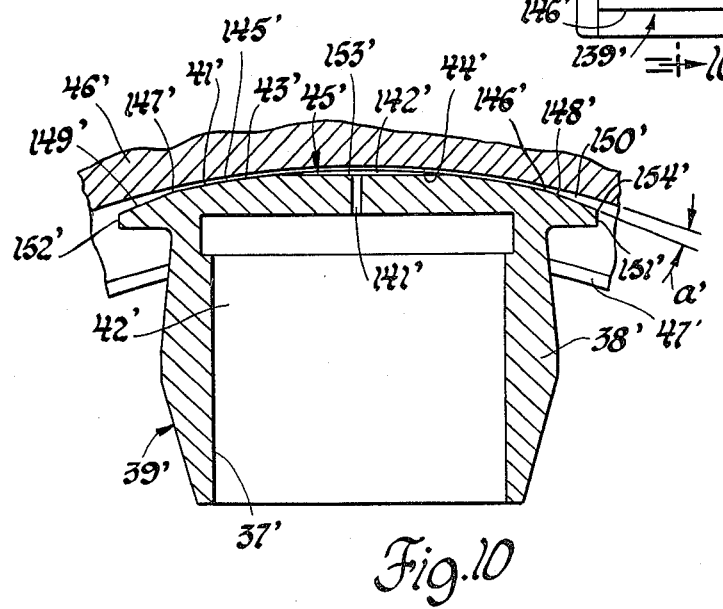

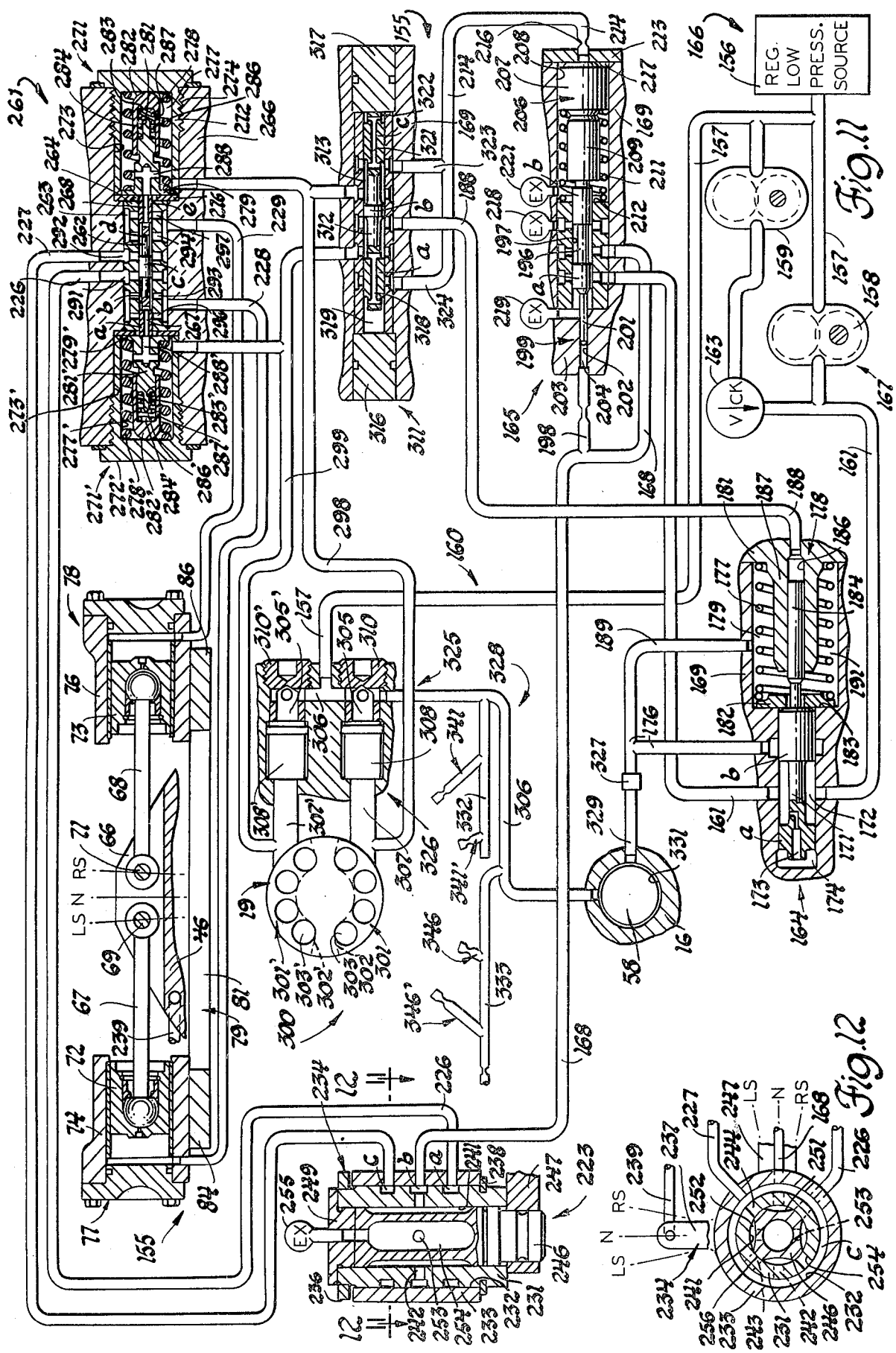

HYDROSTATIC TRANSMISSION LUBRICATION

FIELD OF THE INVENTION

The invention herein described was made in the course of work performed under a contract or subcontract thereunder with the United States Department of the Army.

This invention relates to hydrostatic transmission lubrication systems and particularly to hydrostatic pump or motor units having hybrid slipper bearing lubrication.

BACKGROUND OF THE INVENTION

This invention provides an improved hydrostatic transmission of the radial piston type shown in U.S. Pat. No. 3,274,946 Simmons, granted Sept. 27, 1966, and U.S. Pat. No. 3,752,010 Tipping, granted Aug. 14, 1973, and may be used, for example, in the hydrostatic transmission shown in the above U.S. Pat. No. 3,274,946, in hydromechanical transmissions as shown in the above U.S. Pat. No. 3,752,010, or U.S. Pat. No. 3,982,448 Polak et al, granted Sept. 28, 1976, and especially in cross-drive transmissions having a hydrostatic steer-drive transmission unit such as in U.S. Pat. No. 3,373,636 Livezey et al, granted Mar. 19, 1968, and U.S. Pat. No. 3,640,157 Schaefer, granted Feb. 8, 1972. Related controls are shown in the above U.S. Pat. No. 3,640,157.

SUMMARY OF THE INVENTION

This invention provides an improved lubrication system for radial piston pump and motor units having piston member and cylinder member pairs rotating with a rotor. One of these members of each pair is supported by a hybrid bearing having a slipper bearing rotating on a nonrotating internal bearing of a bearing ring. In the pump and motor lubrication systems, each hybrid bearing has a hydrostatic or load-responsive component and a hydrodynamic or speed-responsive component. In the hydrostatic component, hydrostatic power pressure is supplied to a distribution recess in the slipper bearing to provide a hydrostatic balancing pressure having a pressure gradient proportional to hydrostatic power pressure, and acting during higher or running speed operation on the slipper bearing area to balance a high portion, but not all of the hydrostatic load. In the hydrodynamic component, lubrication pressure is supplied to the bearing clearance between the slipper bearing and internal bearing to provide a hydrodynamic balancing pressure gradient proportional to the speed of rotation, acting on the slipper bearing areas at the sides of the distribution recess, and increasing the effect of hydrostatic balancing pressure to balance centrifugal or hydrodynamic load and the remaining hydrostatic load. The hydrostatic power pressure flow is limited to meet low speed bearing lubrication fluid flow requirements to minimize parasitic loss. The hydrodynamic balancing pressure fluid flow increases with speed to meet requirements which increase with speed. The total balancing pressure varies in response to total load and speed to meet, but no exceed, requirements which also vary with total load and speed. A minimum lubrication fluid flow supplied by hydrostatic power pressure is used and supplemented by hydrodynamic lubrication flow for maximum bearing lubrication efficiency. Hydrodynamic balancing pressure acts both for balancing and increasing the effect of hydrostatic balancing pressure, so a minimum slipper bearing area can be used for maximum bearing efficiency.

The hydrostatic transmission has a pump and a motor of the radial piston type with each cylinder rotatably supported by a hybrid or combination hydrostatic and hydrodynamic bearing on a bearing ring. Each hybrid bearing has a slipper bearing surface on a cylinder engaging an internal bearing surface on the bearing ring with running clearance therebetween. The hydrostatic bearing component has a restricted port connecting hydrostatic power pressure fluid from the cylinder to supply the distribution recess in the slipper bearing surface for hydrostatic pressure feed of the fluid film, providing a hydrostatic balancing pressure component between the slipper and internal bearing surfaces having a pressure gradient decreasing from about full hydrostatic power pressure at the distribution recess to zero pressure at the edges of the slipper bearing surface. This pressure gradient, proportional to hydrostatic power pressure, acts on a minimum area slipper bearing surface during running speed operation to balance a high portion but not all of the hydrostatic power pressure load and to meet, but not significantly exceed, flow requirements for low speed operation. During low hydrostatic load operation, the bearing clearance and fluid film thickness is larger and the restricted port limits hydrostatic power fluid flow to the bearing. During high hydrostatic load operation, the bearing clearance and fluid film thickness is smaller and further limits hydrostatic power fluid flow to the bearing to minimize the use of hydrostatic power fluid for lubrication. The hydrodynamic bearing component employs a low pressure source to spray fluid on the internal bearing surface, annular dams on each side of the bearing ring to retain fluid on the internal bearing surface, and a taper at the leading edge of the slipper bearing surface to force fluid into the bearing clearance and to provide a hydrodynamic balancing pressure component and fluid flow between the bearing surfaces having a pressure increasing proportional to increasing speed to balance the centrifugal load and effect balancing of the remainder of the hydrostatic load and to provide the increased flow requirements for increasing speed operation. The hydrodynamic and hydrostatic balancing pressures coact to provide a hydrostatic pressure flow decreasing effect which increases with speed to counteract the hydrostatic pressure flow which increases with load to minimize hydrostatic pressure flow. The hydrostatic and hydrodynamic balancing pressures coact additively to increase the average total balancing pressure to reduce the required slipper bearing area for maximum efficiency. The total of the hydrostatic and hydrodynamic balancing pressures balances the total load as it varies from minimum to maximum due to hydrostatic load and speed variation, and the total flow through the bearing increases with speed to meet flow requirements which increase with speed to minimize hydrostatic power fluid flow for lubrication and minimize shear losses for best efficiency. In the pump, which is always rotating when under a hydrostatic power pressure load, the hydrostatic bearing component acts at all speeds to balance a high portion but not all of the hydrostatic load, and has a distribution recess which is a narrow longitudinal groove so that the hydrodynamic bearing component has the taper extending substantially completely across the leading edge and supplies fluid to substantially all of the bearing surface area, so the hydrodynamic balancing pressure component is larger than the hydrostatic balancing pressure component for best efficiency of the hybrid bearing to meet pump lubrication requirements. In the motor, which rotates only while under hydrostatic power pressure load, the hydrostatic bearing component has a larger area and wider central distribution recess, so the hydrostatic balancing pressure at low starting speeds balances all of the hydrostatic load and at higher running speeds balances, a high portion but not all of the hydrostatic load and the hydrodynamic bearing component has a leading edge taper supplying a smaller bearing area at the sides of the distribution recess, so the hydrostatic balancing pressure component is larger than the hydrodynamic balancing pressure component for the best efficiency of the hybrid bearing to meet motor lubrication requirements.

In the hydrodynamic component of the lubrication system, the annular dam members at each side of the bearing ring only extend radially inwardly of the inner bearing surface of the bearing ring by a small amount to retain a shallow body of fluid on the internal bearing so the slipper bearings, during rotation, will have a small body of fluid at their leading edges to force fluid under the leading edge of the slipper bearing for lubrication. The spray nozzles are located above the center line or in the upper quadrant so fluid is sprayed directly on the cylinders for cooling and lubrication, and on the top portion of the internal bearing surface and flows by gravity and is distributed by the slipper bearings to other portions of the internal bearing surface. The slipper bearings have, extending across the leading edge of their bearing surface, a chamfer or taper providing an entrance wedge of lubricant between the bearing surfaces of the slipper bearing and bearing ring. During rotation of the slipper bearing, fluid is forced into the entrance wedge space, causing fluid flow to the bearing running clearance and providing a fluid lubricant film between the bearing surfaces.

These and other features of the invention will be more apparent from the accompanying drawings and following description of a preferred embodiment.

BRIEF DESCRIPTION OF THE DRAWINGS

FIG. 5 is a view of the pump cylinder from the slipper bearing end.

FIG. 6 is a side view of FIG. 5, on the line 6—6.

FIG. 7 is an enlarged partial sectional view of FIG. 5, on the line 7—7.

FIG. 8 is a plot of balancing pressure gradient curves across the width of the bearing surface.

FIG. 9 is a view of the motor cylinder from the slipper bearing end.

FIG. 10 is an enlarged sectional view of FIG. 9 on the line 10—10.

FIG. 11 is a schematic view of the control system and lubrication supply system.

FIG. 12 is a partial sectional view, with parts broken away, of the steer valve, on line 12—12 of FIG. 11.

DESCRIPTION OF PREFERRED EMBODIMENT

Figure 1:
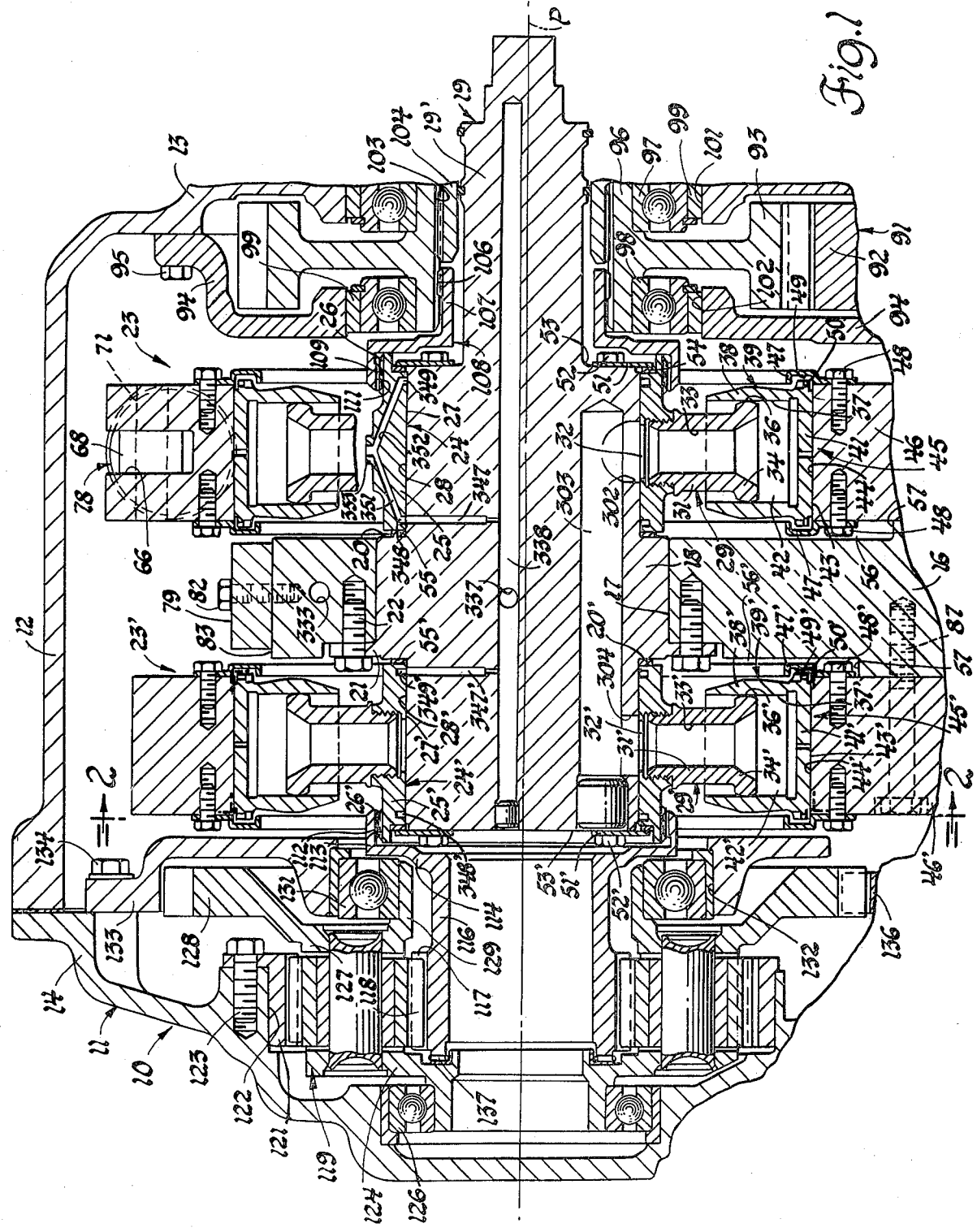
FIG. 1 is a partial sectional view of the hydrostatic transmission, mainly on the line 1—1 of FIG. 2.
Figure 2:
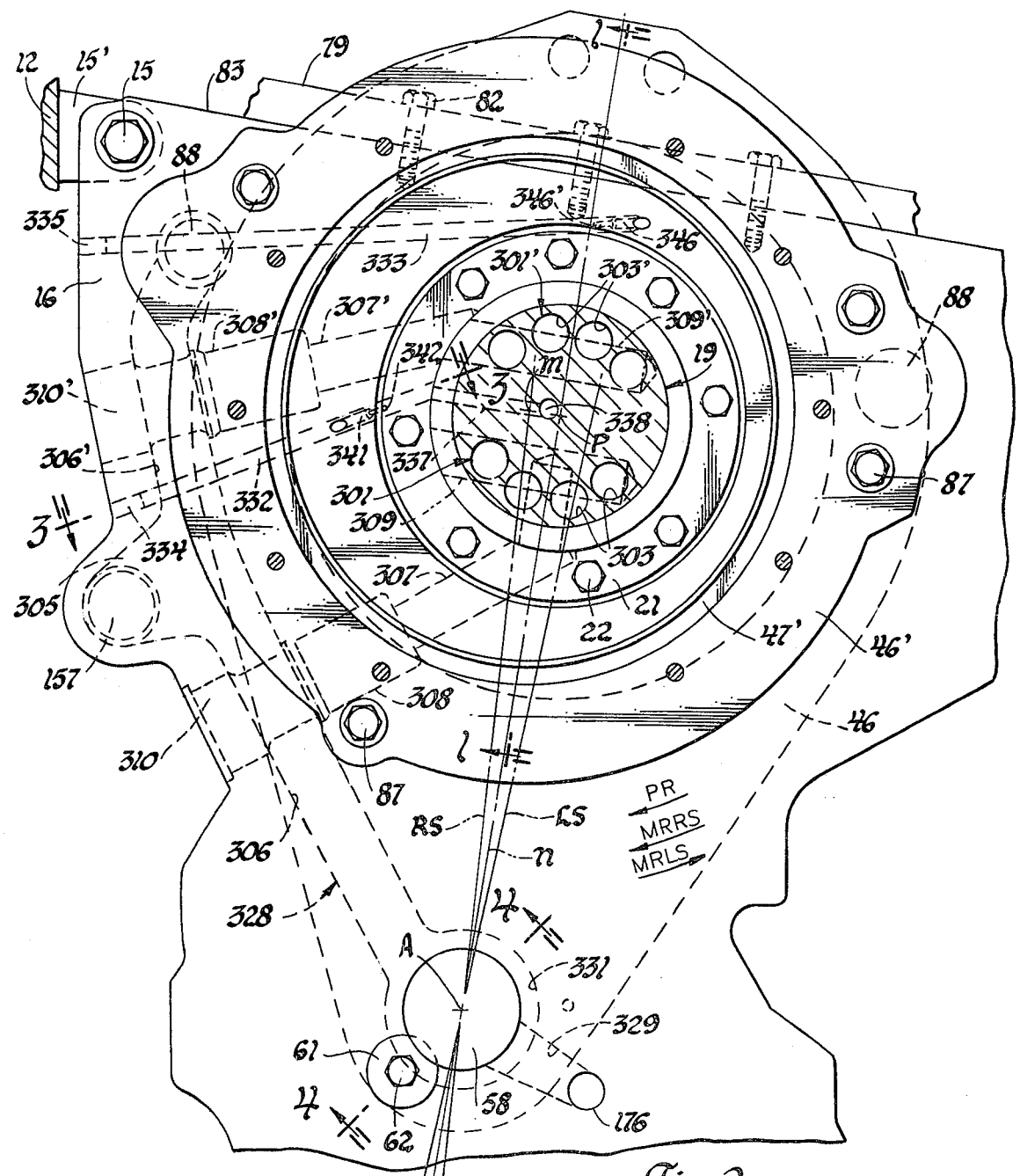
FIG. 2 is a reduced partial cross section of FIG. 1, on the line 2—2.

FIGS. 1 and 2 show a structural arrangement of the hydrostatic transmission 10. Transmission 10 has a housing 11 having a partial barrel portion 12, an input end wall 13 and an output end wall 14. Central support wall 16 is secured to housing 11 by a plurality of screws 15 fastened to ears 15' on barrel portion 12 of housing 11, spaced around the perimeter of central support wall 16—one screw 15 and one ear 15' being shown in FIG. 2. Central support wall 16 has a circular opening 17 formed therein to receive the support cylinder 18 of the pintle 19 which supports the pump 23 and motor 23' of hydrostatic transmission 10. A securing flange 21, on the end of support cylinder 18, is secured by fasteners 22 to the support wall 16 to fix pintle 19 to central support 16 fixed in housing 11. In pintle 19, support cylinder 18, smaller diameter cylindrical pump bearing 28, and motor bearing 28', and pintle end portion 19', are centered on pintle axis (P). Pintle end portion 19' may be used to provide fluid connections (not shown) from this hydrostatic transmission 10, when used for steer-drive, to other portions of a propulsion and steer-drive transmission in which this hydrostatic transmission may be used as the steer-drive.

Pump 23 has a rotor 24 with a sleeve portion 25 having drive spline 26, and an internal bearing 27 rotatably mounted on cylindrical pump bearing 28 on pintle 19. There is a step 20 between the larger diameter support cylinder 18 and smaller diameter cylindrical pump bearing 28. Pump rotor 24 also has piston members 29 (preferably nine), each having a tubular support portion 31 secured at one end, preferably by threads, to sleeve portion 25 is rotor port 32, and each having a through-passage 33 aligned with rotor port 32. Each piston member 29 also has an annular piston portion 34 formed integrally with or fixed on the distal end of each tubular support portion 31. Each annular piston portion 34 has an external spherical surface 36, annular in extent, contacting the inner cylindrical surface 37 of cylinder portion 38 of cylinder member 39, and cooperating with each piston member 29. Each cylinder member 39 has a slipper bearing 41, formed integrally with or secured to cylinder portion 38, to close the radially outer end of the cylinder portion 38 and provide a cylinder chamber 42 between piston member 29 and cylinder member 39. Each slipper bearing 41 has a cylindrical slipper bearing surface 43 engaging the cylinder internal bearing surface 44 of pump bearing ring 46, constructed as described below with reference to FIGS. 5 to 7, to provide a hybrid bearing 45 having a hydrostatic bearing component 138 and a hydrodynamic bearing component 139. Annular dams 47 are secured by a plurality of fasteners 48 to each side of the pump bearing ring 46 and project radially inwardly a short distance, about equal to the thickness of the slipper bearing 41, beyond internal bearing surface 44 to retain fluid on internal bearing surface 44 for lubrication. Each annular dam 47 has an annular recess 49 formed therein for receiving guides 50, one at each end on each side, and of matching circular shape on the slipper bearing 41 of cylinder member 39 (best shown in FIGS. 5 and 6), to mechanically position the cylinder member 39 near operating position so the fluid pressure and centrifugal forces during operation will move slipper bearing 41 radially, without canting, into contact with pump bearing ring 46. An annular stop member 51 is secured by screws 52 to annular step surface 53 of pintle 19 between pump bearing 28 and pintle end portion 19' to retain thrust bearing 54 on one side of pump rotor 24. Thrust bearing 55 is located at the other side, between pump rotor 24 and the step 20, to axially locate pump rotor 24.

Fixed displacement motor 23' has the same structure as pump 23, except as pointed out below, so like reference numerals (primed) have been applied to the parts of motor 23' which are like the above-described parts of pump 23 and pintle 19, and reference is made to the above description of pump 23. Motor 23' includes a motor bearing 28' on pintle 19, a motor rotor 24' having a sleeve portion 25' rotatably mounted on motor bearing 28', and piston members 29' slidable in cylinder members 39', each having a slipper bearing 41' with a slipper bearing surface 43' engaging the internal bearing surface 44' of motor bearing ring 46'.

The pivotal mounting of pump bearing ring 46 to vary displacement of pump 23 and the fixed mounting of motor bearing ring 46' of fixed displacement motor 23' are described below. The differences between the pump and motor slipper bearing surfaces 43 and 43' of slipper bearings 41 and 41' are described below, with reference to FIGS. 5 to 11.

Central support wall 16 has, on the pump side, a pump clearance recess 56 with an outer diameter 57 concentric with axis (P) of pintle 19, and sufficiently large so as to provide clearance for the adjacent annular dam 47 on pump bearing ring 46 to permit displacement-varying movement of pump bearing ring 46 in opposite directions from the null position on the null axis (N), as shown in FIG. 2 and hereinafter described. Central support wall 16 has, on the motor side, motor clearance recess 56' having an outer diameter 57' concentric with motor axis (M), FIG. 2, to provide clearance for the adjacent dam 47' on fixed motor bearing ring 46'.

Figure 4:
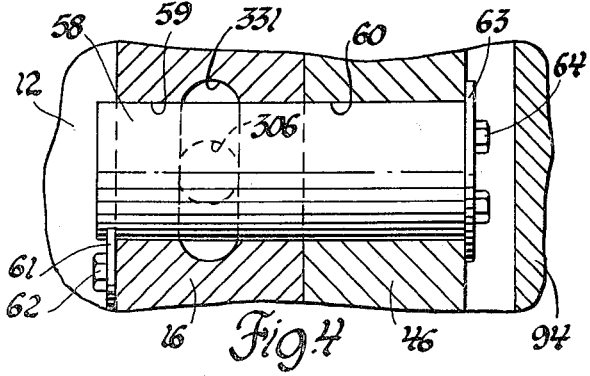
FIG. 4 is a reduced partial sectional view of FIG. 2, on the line 4—4 showing the pump ring pivot.

The pump bearing ring 46 is pivotally supported by a pin 58 located in bores 59 and 60 respectively in central support wall 16 and pump bearing ring 46 (FIGS. 2 and 4). A circular key 61, fitting a circular keyway in pin 58 and secured by screw 62 to support wall 16, fixes pin 58 to support wall 16. A circular retainer plate 63, secured by screws 64 to the opposite end of pin 58, retains pump bearing ring 46 on pin 58 against support wall 16 for pivotal movement about pivot axis (A) of pin 58 to vary pump displacement. Presently a headed pin and retainer plate 63 (not shown) is used. Pump bearing ring 46 (FIG. 2) is shown on the null axis (N) extending through pivot axis (A) and pintle axis (P) which, in null position (N) is also the pump null axis, or zero stroke or displacement axis.

At the opposite end on the other side of pintle 19, pump bearing ring 46 (FIGS. 1, 2, and 11), has a cross-slot 66 perpendicular to the null axis (N). Connecting rods 67 and 68 respectively are pivotally connected by pins 69 and 71 to pump bearing ring 46 and connected by ball and socket joints to pistons 72 and 73 reciprocally mounted in cylinders 74 and 76 of fluid motors 77 and 78. A support bracket 79 has a central portion 81 secured by screws 82 to the transverse flat end 83 of central support wall 16 and has, at opposite ends thereof, ears 84 and 86 projecting laterally from and secured respectively to cylinders 74 and 76 to support right and left fluid motors 77 and 78 in alignment with pump bearing ring 46.

Motor bearing ring 46' is fixed by two locating dowels 87 and a plurality of screws 88 fastened to central support wall 16 to provide a fixed displacement motor 23'.

At the input end of housing 11 there is an engine driven input drive 91 having a drive gear 92 driving transmission input gear 93 located between input end wall 13 and inner input end wall 94. Screws 95 secure inner input end wall 94 to input end wall 13. Input gear 93 has a sleeve hub portion 96 at its inner diameter. Bearings 97 and 98 are fixed in apertures 101 and 102 respectively in input end wall 13 and inner input end wall 94 and are fixed on the outer diameter of sleeve portion 96 on opposite sides of input gear 93 to rotatably support input gear 93. Apertures 101 and 102 may have steel rings 99 press-fitted into these apertures if housing 11 is made of aluminum. Input gear 93 is drive connected, through sleeve hub portion 96 and its internal splines 103, to splined sleeve shaft 104 employed to drive other components of the transmission, such as a propulsion transmission (not shown), and to pump sleeve shaft 108 by external splines 106 on small diameter portion 107 of pump sleeve shaft 108. The large diameter portion 109 of pump sleeve shaft 108 is connected by internal splines 111 to drive spline 26 on sleeve portion 25 of pump rotor 24 to drive the pump rotor 24.

The motor rotor 24' has drive splines 26' drive connected to internal splines 112 on large diameter portion 113 of motor sleeve shaft 114. Motor sleeve shaft 114 also has a small diameter portion 116 having a sun gear 117. A plurality, preferably four, of planetary pinions 118 are rotatably mounted on a carrier 119 and mesh with sun gear 117 to rotatably support motor sleeve shaft 114. Pinions 118 also mesh with the ring gear 121 seated on an annular seat 122 on the output end wall 14 and secured thereto by screws 123. The outboard side member 124 of carrier 119 is rotatably supported at its inner diameter by bearing 126 mounted on output end wall 14. The inboard side member 127 of carrier 119 has, extending radially outwardly therefrom, an output gear 128 and at a radially inner diameter, a sleeve portion 129 supported within bearing 131 fixed in aperture 132 in inner output end wall 133, which is secured by screws 134 to output end wall 14. Output gear 128 drives final output gear 136. A thrust bearing 137 is located between carrier outboard side member 124 and small diameter portion 116 of motor sleeve shaft 114.

Each of the pump cylinder members 39 has a slipper bearing 41 having a slipper bearing surface 43 in bearing engagement with internal bearing surface 44 and constructed, as shown in FIGS. 1 and 5 to 7, to provide hybrid bearing 45 with a hydrostatic component 138 and a hydrodynamic component 139. The cylinder chamber 42 in pump cylinder member 39 is connected by a restricted port 141 centrally located in cylinder member 39 and slipper bearing 41 to supply hydrostatic power fluid, which is a lubricant, to a narrow distribution recess 142 extending in the direction of rotation of cylinder member 39. Distribution recess 142 is in the form of a shallow narrow groove that extends about the full length of slipper bearing surface 43 and divides the bearing surface 43 into two portions 143 and 144, one on each side of distribution recess 142. Distribution recess 142 functions mainly as a lubricating fluid distribution recess or passage and secondly as a balancing recess providing a small portion of the balancing force. Slipper bearing surface 43 and its portions 143 and 144 are cylindrical and have a diameter less than the cylindrical internal bearing surface 44 by the desired journal bearing running clearance 145, e.g., 0.008 inch radial clearance. At the ends 146 and 147, one being a leading end and the other being a trailing end depending on the direction of rotation, of the bearing surface 43, tapers 148 and 149 begin and respectively enlarge toward edges 151 and 152, one leading and the other trailing during rotation, of slipper bearing 41. During rotation of cylinder member 39 in the direction of rotation (arrow PR, FIG. 7), edge 151 is the leading edge. At the leading edge, taper 148 and internal bearing surface 44 form a wedge-shaped injection space 150 having an entrance portion 154 having a height substantially greater, e.g., about five times, than the lubricating fluid film thickness. The lubricating fluid flows through the running clearance and exits via the taper 149 at the trailing edge 152. In applications where the direction of rotation is reversed, edge 152 becomes the leading edge and taper 149 provides the same type injection space. Distribution recess 142 has a base 153 having a larger diameter than that of slipper bearing surface 43, so the depth of distribution recess 142 below the slipper bearing surface 43 is a maximum at the center at restricted port 141 to ensure free feed flow of hydrostatic power fluid for lubrication to distribution recess 142, and decreases to a minimum depth, substantially zero, at the opposite ends 146 and 147 of bearing surface 43. The slipper bearing surface 43 is only spaced from the internal bearing surface 44 by the thickness of the lubricating fluid film during operation, so distribution recess 142 is enclosed and functions as a fluid distribution passage substantially closed at the sides and ends to maintain hydrostatic balancing fluid in distribution recess 142 substantially at the hydrostatic power pressure in cylinder chamber 42. The restricted port 141 has a very small diameter (e.g., 0.055 inch) and area (e.g., 0.0024 inch), while the distribution recess has a much larger cross-sectional area (e.g., 0.0043 inch), nearly double the area of restricted port 141, so the restricted port at low load limits the hydrostatic power fluid flow for lubrication from cylinder chamber 42 to distribution recess 142 and there is free flow in distribution recess 142. The hydrostatic power fluid in distribution recess 142 flows laterally to both sides to form a lubricating fluid film between the slipper and internal bearing surfaces 43 and 44. This hydrostatic power fluid supply for lubrication provides a hydrostatic balancing pressure gradient decreasing from substantially hydrostatic power pressure in distribution recess 142 at the center to zero at the opposite side edges to provide a hydrostatic balance pressure having an average value about one-half hydrostatic power pressure in the absence of hydrodynamic balancing pressure. This hydrostatic balancing pressure gradient has a transverse profile curve across hybrid bearing 45 (Curve Hs, FIG. 8), for high hydrostatic power pressure operation and similar curves with lower maximum pressures for lower hydrostatic power pressure operation. This hydrostatic balancing pressure acts on the area of the pump slipper bearing surface 43 and varies with hydrostatic load to balance a high portion (90% to 95%), but not all, of the hydrostatic load due to hydrostatic pressure acting on the end area of cylinder chamber 42 at all hydrostatic pressure values.

When the direction of rotation of cylinder member 39 relative to pump bearing ring 46 is such that edge 151 is the leading edge, the taper 148 at leading edge 151 is effective to force lubricating fluid into clearance 145 between the slipper and internal bearing surfaces 43 and 44. The taper 148 forms a wedge injection space 150 completely across leading edge 151 having an entrance portion 154 having a height sufficiently (preferably five times) greater than the fluid (oil) film thickness to force-feed the lubricating fluid for longitudinal flow between slipper and internal bearing surfaces 43 and 44. This hydrodynamic component 139 of the hybrid bearing 45 provides hydrodynamic lubricating fluid flow and balancing pressure proportional to speed to balance the centrifugal load and the remainder of the hydrostatic load. The area and width of distribution recess 142 is small, e.g., 7.5% of the area and width of slipper bearing surface 43, so the leading taper 148 and slipper bearing surface portions 143 and 144 are effective over substantially all of the width and area of slipper bearing surface 43 to provide hydrodynamic balancing pressure and fluid flow. In the absence of hydrostatic balancing pressure at high speed, the hydrodynamic balancing pressure gradient has a transverse profile curve across the hybrid bearing 45 (Curve Hd, FIG. 8) having similar curve portions across each of slipper bearing surface portions 143 and 144, with the pressure being maximum at the center and decreasing to zero at the edges at the side and at the recess 142 for high speed operation. As speed decreases, the maximum hydrodynamic balancing pressure decreases. The hydrodynamic balancing pressure coacts with or confines the hydrostatic balancing pressure to provide a combined or total balancing pressure having a transverse profile (Curve T) having a maximum pressure centrally of each slipper bearing surface portion 143, 144, and decreasing with the hydrostatic pressure gradient to zero at the side edge and to the hydrostatic pressure at recess 142. There is an additive effect of hydrostatic and hydrodynamic balancing pressure limited or reduced by the pressure gradients, so the average total balancing pressure is larger than the average of either the hydrostatic or hydrodynamic balancing pressure.

Since pump 23, during low starting speed operation, always has only the small supercharge hydrostatic pressure load and no higher hydrostatic power pressure load and no significant hydrodynamic load, the hydrodynamic component 139 is not functioning and the hydrostatic component 138 functions to meet these lubrication requirements of hybrid bearing 45. As pump speed is increased to the normal high running speed, hydrodynamic lubricant fluid flow and balancing pressure increase to meet requirements. At high speed and minimum or charging to a low hydrostatic power pressure, the hydrostatic pressure fed through restricted port 141 supplies hydrostatic lubricant fluid at a low balancing pressure only to balance the low hydrostatic load at a low flow rate only sufficient for lubrication and cooling requirements at low speed; and the leading taper 148 provides added hydrodynamic lubricant fluid flow and hydrodynamic balancing pressure to meet the requirements of the hydrodynamic load due to speed for a total lubricating fluid flow and balancing pressure meeting high speed and low hydrostatic pressure lubricating requirements.

Hydrostatic pressure lubrication flow and balancing pressure at minimum hydrostatic pressure, unloaded at starting speeds, meets minimum hydrostatic or total lubrication requirements and, at higher running speeds, is insufficient to meet hydrostatic lubrication requirements. As hydrostatic pressure increases at running speeds to a maximum, the hydrostatic pressure feed supplies hydrostatic lubricating fluid at a flow rate which to increase but is reduced or limited by hydrodynamic balancing pressure and decreasing clearance and at an increasing hydrostatic balancing pressure to meet a large portion but not all hydrostatic fluid flow and balancing pressure requirements. At high speed and minimum hydrostatic pressure, the hydrostatic pressure feed for lubrication has a low flow rate and supplies a minor portion of total fluid flow and balancing requirements, and hydrostatic balancing fluid flow which increases with speed supplies a major portion of total balancing pressure and fluid flow requirements. Hydrodynamic lubricating fluid flow and balancing pressure supplement and limit hydrostatic fluid flow and supplement hydrostatic balancing pressure to meet total requirements as they vary with speed and load to minimize slipper bearing area requirements and minimize the amount of hydrostatic power pressure bled for lubrication and thus power loss over the full range of operation—especially at the critical maximum hydrostatic power pressure.

The motor hybrid bearings 45' shown in FIGS. 1, 9, and 10, are similar to the above-described pump hybrid bearings 45, so like reference numerals (primed) have been used with reference to the above description for like parts and features, and to the following description of the different parts and features. Motor slipper bearing surface 43' engages internal bearing surface 44' of motor bearing ring 46' to provide motor hybrid bearing 45'. Motor cylinder chamber 42' is connected by centrally located restricted port 141' to a distribution recess 142' which is a square recess centrally located in the cylindrical slipper bearing surface 43'. The base 153' of distribution recess 142' is substantially flat so the depth of the recess at the center at restricted port 141' is sufficient for free fluid flow from restricted port 141' to distribution recess 142'. Motor slipper bearing surface 43' has similar ends 146' and 147', tapers 148' and 149', and edges 151' and 152'.

In motor 23' hydrostatic balancing pressure acts on the area of distribution recess 142' and has a hydrostatic pressure gradient decreasing from hydrostatic power pressure at recess 142' to zero at the edges of slipper bearing surface 43'. This decreasing pressure gradient has an average value about one-half of hydrostatic pressure acting on the net area of slipper bearing surface 43' (the area of slipper bearing surface 43' minus the area of recess 142'). Thus, motor hydrostatic balancing pressure curve profile is similar to that of pump 23 (Curve Hs), but hydrostatic pressure extends across the wider recess 142' and acts on a larger area, so average motor hydrostatic balancing pressure is higher in relation to hydrostatic power pressure than average pump hydrostatic balancing pressure. The hydrostatic balancing force provided by hydrostatic balancing pressure acting on the full area of motor slipper bearing surface 43' is equal to all (100%) of the hydrostatic load through the full range of hydrostatic power pressure acting on the end area of motor cylinder chamber 42' at lower starting speeds, and is a high portion (90% to 95%), but not all, of the hydrostatic load during higher running speed operation. The restricted port 141' is small (e.g., 0.055 in.) to provide a rate of flow and amount of lubricating fluid increasing with hydrostatic pressure just meeting bearing fluid flow rate requirements as hydrostatic pressure increases at low starting speeds. As speed increases in one direction so edge 151' is the leading edge, the taper 148' injects lubricating fluid into running clearance 145' between slipper bearing surface 43' and internal bearing ring surface 44' to increase lubricating fluid flow to meet lubricating fluid flow requirements of hybrid bearing 45' which increase with speed. The motor hydrodynamic balancing profile is like that of the pump (Curve Hd), but basically extends only over the smaller width and area of slipper bearing surface 43' between recess 142' and the side edges, and thus has a smaller average pressure acting on a smaller area than in the pump.

Motor hydrodynamic balancing pressure confines and additively coacts with motor hydrostatic balancing pressure, as in the pump, to provide a larger total balancing pressure. Since the area of the square distribution recess 142' is about twice that of the narrow groove-type distribution recess 142, motor slipper bearing 41' provides more balancing force due to hydrostatic pressure than that provided by pump slipper bearing 41. Since the injected speed-responsive or hydrodynamic balancing pressure acts on about 20% less area in motor slipper bearing 41' than in pump slipper bearing 41, the hydrodynamic balancing pressure provides a smaller portion of total balancing pressure and lubricating fluid flow. Since in motor 23' the hydrostatic pressure increases so as to overcome the load for low speed starting operation, the hydrostatic lubricating fluid supply must provide the hydrostatic balancing pressure and flow to meet the lubrication requirements of hybrid bearing 45' at the hydrostatic load required at zero speed to start rotation or during starting operation. As speed increases, hydrodynamic balancing pressure and flow increase in order to meet increasing hydrodynamic load and speed lubrication requirements. The increasing hydrodynamic balancing pressure and flow act to confine and reduce the hydrostatic balancing pressure and flow and to provide supplemental hydrodynamic balancing pressure to balance the remaining hydrostatic load at higher running speeds. The hydrostatic and hydrodynamic balancing pressures additively coact to provide higher total balancing pressure and flow varying with hydrostatic load and speed to meet the requirements of hybrid bearing 45'. In motor 23', the hydrostatic balancing pressure provides a larger portion of total balancing pressure than that provided by the hydrodynamic balancing pressure to meet starting under load lubrication requirements.

CONTROLS

The hydrostatic transmission 10, especially when used in the steer drive of a cross-drive transmission, has an input-driven input drive 91 driving the pump 23 at or in a constant proportion to engine speed which usually is governed. Hydrostatic transmission 10 is controlled by hydraulic controls 155 (FIGS. 11 and 12) to vary the displacement of pump 23 and the speed of motor 23' so as to meet drive operation requirements. In a steer drive, motor speed varies from zero for straight drive to a maximum for the sharpest or smallest radius turn. Hydrostatic power pressure fluid is delivered by pump 23 to motor 23'. The hydrostatic power pressure varies with steer torque load from a minimum or supercharge pressure to a maximum pressure pressure value, as the turning radius decreases to the tightest turn, pivot steer. The hydrostatic power pressure in each of the pump cylinder chambers 42, during each revolution when pump 23 is driven, in the intake phase has a supercharge pressure value, and in the delivery phase has hydrostatic power pressure at a value which varies from the supercharge pressure value at zero pump displacement and zero steer torque load for straight drive, to a maximum pressure value at maximum steer torque load. The hydrostatic power pressure in each of the motor cylinder chambers 42', during each revolution when hydrostatic pressure fluid is delivered by pump 23 to motor 23', in the intake phase is the hydrostatic pressure value and in the exhaust phase is the supercharge pressure. When pump 23 is in a null (N) position having zero displacement (FIG. 2), the hydrostatic power pressure in pump and motor cylinder chambers 42 and 42' is supercharge pressure, so there is no steer drive. In null (N) position pump 23 may have a small displacement, so the hydrostatic power pressure value is slightly higher than supercharge pressure value to more positively position the pump bearing ring 46. Hydrostatic power pressure in each of the pump and motor cylinder chambers 42 and 42' acts on the respective end area of each cylinder chamber to provide a hydrostatic load on pump and motor slipper bearings 41 and 41' proportional to hydrostatic pressure and steer torque load, and a centrifugal or hydrodynamic load proportional to speed.

The hydraulic steer controls 155 (FIG. 11) have a low pressure system 160 with a low pressure supply 166 including regulated low pressure source 156, e.g., an engine-driven pump and regulator valve, connected to low mainline 157 to supply low mainline pressure, e.g., 150 psi (1034 kPa). In low pressure system 160, low mainline 157 supplies charging and lubrication systems 326 and 328 and, in parallel, first pump 158 and second pump 159, both driven by a transmission element and connected respectively directly and through check valve 163 and forming a high pressure supply 167, to supply high mainline 161.

Regulator Valves

High mainline 161 is connected to and regulated by primary regulator valve 164 (FIG. 11). High mainline 161 normally is connected without regulation, and at times connected with regulation, by secondary regulator valve 165 to control pressure line 168.

Primary regulator valve 164 has a valve element 171 having equal-diameter lands 171a and b slidable in a valve bore 172 in valve body 169. In all positions of valve element 171, high mainline 161 is connected to bore 172 between lands 171a and b, and connected by a passage 173 in valve element 171 extending through land 171a to a closed chamber 174 at the end of bore 172, so high mainline pressure acts on the end area of land 171a in a pressure-decreasing direction to connect high mainline 161 to overage line 176 to decrease high mainline pressure by exhausting high mainline 161 and supplying overage line 176. Overage line 176, also a part of low pressure supply 166, is connected by cross-passage 306 of lubrication passage system 328 (described below), to low mainline 157 and always has low mainline pressure. Valve element 171 is biased in a pressure-increasing direction by a spring 177, high steer pressure actuator 178, and low mainline pressure. Spring 177 is located in spring bore 179 which has a larger diameter than and is coaxial with valve bore 172, and is seated on an end wall 181 secured to valve body 169. Spring 177 acts through annular member 182 in engagement with the end of land 171b to bias valve element 171 in a pressure-increasing direction closing the connection of high mainline 161 to overage line 176 for increasing high mainline pressure. Movement of valve element 171 in the pressure-increasing direction is limited by annular member 182 engaging stop 183 between bores 172 and 179.

Steer pressure actuator 178 has a small diameter actuator piston 184 in actuator bore 186 which has a smaller diameter than and is coaxial with valve bore 172, in a cylinder 187. Cylinder 187 is formed as a portion of or attached to end wall 181 and located concentrically within spring 177. Cylinder 187 also acts as a spring guide. The higher steer pressure line 188 is connected to actuator bore 186 to act on piston 184 which extends through the center of annular member 182 to engage the end of valve element land 171b. An overage branchline 189, which may be restricted, connects overage line 176 to a closed chamber 191 in spring bore 179, closed by end wall 181, so low mainline pressure acts on the end area of land 171b.

Overage line 176 is connected to low mainline 157 by lubrication passage system 328 (hereinafter described), and regulated low pressure source 156 provides downstream regulation, so both overage pressure and lubrication pressure have the same constant low pressure value as low mainline pressure. Overage, or low main pressure at the low mainline pressure value, is supplied by overage branchline 189 to the closed chamber 191 in spring bore 179 and provides a constant bias force on valve element 171 to reduce the bias force requirements of spring 177 for more accurate calibration. The overage fluid pressure and spring bias forces on valve element 171 provide a constant minimum high main pressure (e.g., 400 psi [2758 kPa]), when the higher hydrostatic power or steer pressure is in a low range, up to an intermediate pressure value (e.g., 200 psi [1379 kPa]). The high main pressure increases from the constant minimum pressure value in a reduced proportion to a maximum value (e.g., 400 to 1800 psi [1379 to 12,411 kPa]), as the higher hydrostatic steer pressure increases from the intermediate to a maximum value (e.g., 200 to 4000 psi [1379 to 27,580 kPa]).

The secondary regulator valve 165 has a valve element 196 having equal-diameter lands 196a and b slidable in a valve bore 197 in the valve body 169. The control pressure line 168 is connected to bore 197 between lands 196a and b in all positions of valve element 196 and also is connected via restricted branchline 198 to control pressure actuator 199. Control pressure actuator 199 has a small diameter actuator piston 201 slidable in a small diameter actuator bore 202 in end wall 203 of valve body 169. Control pressure from line 168 is supplied via restricted branchline 198 to chamber 204 in the actuator bore 202 to act on actuator piston 201 which engages the end of land 196a to bias valve element 196 to the exhaust or pressure-decreasing position shown (FIG. 11), with a bias force proportional to control pressure. The low steer pressure actuator 206 has a large diameter actuator piston 207 slidable in large diameter actuator bore 208. Piston 207 has or engages a force-strut 209 engaging the end of land 196b to bias valve element 196 to the pressure-increasing position. A spring 211 is positioned in actuator bore 208, guided by force-strut 209, seated on a step 212 between large actuator bore 208 and valve bore 197, and engages actuator piston 207 to bias piston 207 into contact with end wall 213 to permit control pressure in control pressure actuator 199 to move valve element 196 to the exhaust position. The low steer pressure line 214 has a restriction 216 and is connected, through end wall 213 to a chamber 217 between end wall 213 and piston 207, to bias valve element 196 in a control pressure-increasing direction by a bias force proportional to low steer pressure, as reduced by the bias force of spring 211. With valve element 196 in the exhaust position, secondary regulator valve 165 connects control pressure line 168 to exhaust 218 and, in the pressure-increasing or connecting position, connects high mainline 161 to control pressure line 168. Exhaust 219 vents valve bore 197 between land 196a and end wall 203. Exhaust 221 vents actuator bore 208 between valve element 196 and piston 207.

As described below, low mainline 157 supplies lubrication fluid to lubrication passage system 328 and supercharge fluid to the lower pressure one of charging passages 307, 307' of power transfer passage system 300; shuttle valve 311 supplies low steer pressure to the low steer pressure line 214. Low steer pressure, in a normal range between mainline pressure and an intermediate or signal pressure (e.g., 300 or 150 psi to 80 psi [2068 or 1034 to 552 kPa]), indicates that these systems are supplied with normal operating pressure. Low steer pressure acts on low steer pressure actuator 206 to control secondary regulator valve 165 to regulate the control pressure in control pressure line 168. When low steer pressure is in the normal range, secondary regulator valve 165 is closed and control pressure is the same as high mainline pressure. As low steer pressure decreases in an intermediate or signal range, from the intermediate or signal pressure to a minimum operating pressure (e.g., 80 to 30 psi [552 to 207 kPa]), secondary regulator valve 165 proportionally reduces the maximum available control pressure, from maximum high mainline and control pressure to zero (e.g., 1800 psi [12,411 kPa]), so as to reduce steer drive capacity to provide a signal warning the operator of the decreasing charging and lubrication pressures, and to abort steer drive at minimum capacity operating pressures.

Steer Valve

The control pressure in control pressure line 168 (FIGS. 11 and 12) is selectively directed by steer valve 223 to the right and left steer signal lines 226 and 227 to control steer in accordance with steer demand. The right and left steer signal lines 226 and 227 are connected to the stroke limiter valve 261 to limit steer torque and to supply steer control pressure, as described below, to right and left steer control lines 228 and 229. The right and left steer control lines 228 and 229 are respectively connected to chambers or cylinders 74 and 76 of right and left fluid motors 77 and 78 (described above), to control the position of pump bearing ring 46 and the stroke or displacement of pump 23 for steering. When there is no steer demand, the right and left steer control pressures supplied to right and left fluid motors 77 and 78 are equal, and position pump bearing ring 46 in the null or zero (N) displacement position (FIGS. 2 and 11) for neutral or straight-line drive. When there is right or left steer demand, right or left steer pressure differential, sufficient to overcome the pump centering force, moves pump bearing ring 46 through increasing angular positions to the maximum right or left stroke (RS), (LS) positions for maximum right or left steer.

The steer valve 223 comprises a cylindrical sleeve servo valve element 231 rotatably mounted in a bore 232 in the valve body 233 fixed to transmission housing 11, and a steer valve element 246 rotatably mounted in the central bore 241 of servo valve element 231. A lever member 234 has a ring portion 236 fixed on the end of servo valve element 231 projecting from bore 232, and a lever portion 237 extending radially from the axis of rotation of servo valve element 231. Ring portion 236 and a snap ring 238 secured on the opposite end of valve element 231 engages the ends of valve body 233 to axially locate servo valve element 231 in the bore 232. A link 239 is pivotally connected to lever portion 237 and to pump bearing ring 46 to rotate servo valve element 231 from null or center (N) position to right or left steer (RS), (LS), positions in proportion to pivotal movement of pump bearing ring 46 from null (N) position to right or left steer (RS), (LS), positions.

The servo valve element 231 has three annular channels a, b, and c, in its outer periphery, closed by bore 232 of valve body 233. Control pressure line 168 is continuously connected to supply control pressure, via intermediate channel b and diametrically opposed inlet or control pressure ports 242 in servo valve element 231 to feed supply recesses 251 in steer valve element 246. Right steer signal line 226, which controls right fluid motor 77, is continuously connected in servo valve element 231 by channel a and diametrically opposed right control ports 243—whose connection to supply and exhaust recesses 251 and 252 is controlled by steer valve element 246. Left steer signal line 227, which controls left fluid motor 78, is continuously connected in servo valve element 231 by channel c and diametrically opposed left control ports 244—whose connection to supply and exhaust recesses 251 and 252 is controlled by steer valve element 246. These pairs of right and left control ports 243 and 244 are at right angles to each other; and the pair of control pressure ports 242 are located at half this angle, or 45° from adjacent right and left control ports 243 and 244. The relative rotary positions of servo valve element 231 and steer valve element 246 selectively control the connections between these pairs of ports.

A known manual steer lever or wheel may be connected by linkage (not shown) to rotate the steer lever 247 which is secured to steer valve element 246 to rotate steer lever 247 and steer valve element 246 from the null or center (N) position shown in FIG. 12 for straight drive to steer demand positions for right (RS) or left (LS) steer. An end wall 249 is secured to or is a portion of steer valve element 246. End wall 249 and steer lever 247 engage opposite ends of servo valve element 231 to axially retain steer valve element 246 in the central bore 241 of servo valve element 231.

As indicated above, steer valve element 246 has a pair of supply recesses 251 and a pair of exhaust recesses 252 formed therein, each pair having diametrically opposed recesses in its periphery, closed by central bore 241. The pairs of recesses are at right angles to each other. Exhaust recesses 252 are connected by diametrically opposed exhaust ports 253 to an exhaust passage 254, which extends axially in steer valve element 246 to the exhaust 255 through end wall 249. The adjacent supply and exhaust recesses are separated by longitudinally extending lands 256 which are slightly narrower than the diameters of right and left control ports 243 and 244 in the servo valve element 231. Supply recesses 251 connect inlet ports 242 selectively to right and left control ports 243 and 244; and exhaust recesses 252 selectively connect right and left control ports 243 and 244, to exhaust fluid through exhaust ports 253 and exhaust passage 254 to exhaust 255.

The servo valve element 231 and manual steer valve element 246 are shown (FIG. 12) in their central or null (N) position in which manual steer valve 223 provides zero pump stroke. In null (N) position, lands 256 are aligned with right and left control ports 243 and 244. Manual steer valve 223 is an open-center type valve, since lands 256 are narrower than the diameters of ports 243 and 244, thus providing a clearance which permits controlled fluid flow between control pressure supply recesses 251 and right and left control ports 243 and 244 and between these control ports and exhaust recesses 252. This causes the pressure in control ports 243 and 244 and in the respective cylinders 74 and 76 of the stroke control fluid motors 77 and 78 to build to the same fluid pressure value (about half of low control pressure) to hold pump bearing ring 46 at zero stroke, the null (N) position (FIGS. 2 and 11). The hydrostatic pump 23, in null (N) position, does not deliver fluid to drive the hydrostatic motor 23'. Then when manual steer valve element 246 is rotated in either direction, the control pressure supply recesses 251 are further opened to one of the pairs of control ports 243 and 244, while the other pair of control ports is further opened to the control exhaust recesses 252. For example, when the manual steer valve element is rotated clockwise for right steer (RS), as viewed in FIG. 12, supply recesses 251 are further opened to right control ports 243, while left control ports 244 are further opened to exhaust recesses 252. This causes a pressure imbalance or differential between cylinders 74 and 76, with the pressure increasing in right cylinder 74 and decreasing in left cylinder 76. This causes piston 72 of right fluid motor 77 to move piston 73 of left fluid motor 78, so both pistons move to change the angle of pump bearing ring 46 from null (N) position toward right steer (RS) position to increase the stroke of hydrostatic pump 23. Thus, hydrostatic pump 23 is caused to deliver high hydrostatic power pressure fluid to drive hydrostatic motor 23' in the direction for right steer (RS), the fluid delivery in this condition being from pump 23 to right power transfer passage 301. Since pump bearing ring 46 is connected by link 239 to lever portion 237 of servo valve element 231, servo valve element 231 rotates to follow manual steer valve element 246. When servo valve element 231 nearly catches up with the steer valve element 246, their relative normal constant steer positions are reestablished with the pressure in both right and left cylinders 74 and 76 having a constant steer, low pressure differential which is sufficient to establish equilibrium. Thus, with the displacement of control motor 77 having increased and the displacement of control motor 78 having decreased and with equilibrium established, the pump bearing ring will remain in a constant steer position. The constant steer differential pressure in cylinders 74 and 76 balances the pump bearing ring 46 reaction forces to hold pump bearing ring 46 in the advanced right steer (RS) position corresponding to the advanced right steer (RS) position of manual steer valve element 246 until steer valve element 246 is moved. With the structural symmetry provided, manual steer valve element 246 and servo valve element 231 cooperate, when steer valve element 246 is rotated in the opposite direction, to decrease the right steer angle of pump bearing ring 46 to null (N) position and on further movement to left steer (LS) position, to provide further movement in the opposite direction to a left steer (LS) angular position of pump bearing ring 46 to reverse the direction of fluid flow to the hydrostatic motor 23' (i.e., high hydrostatic power pressure fluid flows to left power transfer passage 301'), so that motor 23' is driven in the opposite direction.

Stroke Limiter Valve

A stroke limiter valve 261 (FIG. 11) under conditions which would cause a torque overload on the hydrostatic pump 23, interrupts, limits, or reverses the pressure of the control fluid selectively supplied by steer valve 223 to the right or left steer signal lines 226 or 227 during transfer to right or left steer control lines 228 or 229, so that the degree of steer demanded by the vehicle operator is overridden to the extent of limiting steer and thus torque requirements to the degree possible without pump and steer system torque overload. The stroke limiter valve 261 comprises a valve element 262 having equal-diameter lands a, b, c, d, and e, located in a bore 263 of a sleeve 264 which is fixed in valve body 266. On each side of central land 262c, there is respectively an intermediate land b and d and an end land a and e. The space between intermediate and end lands b and a is connected by a passage 267, through land a to the end of valve element 262. Similarly, the space between intermediate and end lands d and e is connected by a passage 268, through land e to the end of valve element 262. Right and left biasing assemblies 271 and 271', respectively responsive to right and left steer pressure, are similar and are located opposite ends of stroke limiter valve 261 to normally bias valve element 262 to the central position shown in FIG. 11. Right biasing assembly 271 has a cup member 272 which is secured in a large bore 273 in valve body 266 by threads 274 and has a lip clamping an annular abutment 276 against a shoulder at the end of large bore 273 and valve sleeve 264. In chamber 277 in cup member 272 there is a biasing spring 278 which, at its outer end, contacts the base of cup member 272 and at its inner end, contacts the shoulder 279 of a piston 281 to urge piston 281 toward the valve center against the annular abutment 276. Located within spring 278 is a cylinder 282 having a closed-end bore 283 in which the piston 281 is located. A damper spring 284 is located in the damping chamber 286 between the closed end of cylinder bore 283 and piston 281. Damping chamber 286 is connected to the surrounding chamber 277 by a restricted passage 287 in cylinder 282. Cylinder 282 is bottomed or engages at its outer end on the base of cup member 272. Biasing spring 278 provides the major bias force and damper spring 284 provides a minor bias force for biasing piston 281 so its shoulder 279 normally engages the annular abutment 276 and biases valve element 262 to the central position shown. A passage 288 in piston 281 connects the end of piston 281 adjacent the land e end of valve element 262 to chamber 277 of cup member 272.

Stroker limiter valve 261 has a similar left biasing assembly 271' at the opposite end, so the same reference numerals (primed) have been used, and reference is made to the above description of right biasing assembly 271. Right and left annular abutments 276 and 276' secure valve sleeve 264 in the valve body 266. Right and left biasing springs 278 and 278', with a little assistance from right and left damper springs 284 and 284', bias valve element 262 to the central position shown in FIG. 11.

The right and left steer signal lines 226 and 227 are respectively connected to right and left signal ports 291 and 292 centrally located in valve sleeve 264; right and left steer control lines 228 and 229 are respectively connected to right and left feed ports 293 and 294 and right and left control ports 296 and 297 in valve sleeve 264. The right and left control ports 296 and 297 are near opposite ends of valve sleeve 264 and respectively adjacent right and left feed ports 293 and 294 which, in turn, are respectively adjacent right and left centrally located signal ports 291 and 292. The right and left load signal lines 298 and 299 are respectively connected to right and left chambers 277 and 277' of cup member 272, and right and left passages 288 and 288' in piston 281, to act on opposite ends of valve element 262 and for connection to right and left passages 268 and 267 which are blocked, with valve element 262 in the central position.

During right steer, right load signal line 298 has the high hydrostatic power pressure and left load signal line 299 has charging pressure, providing a hydrostatic differential pressure proportional to steer torque load which biases valve element 262 to right steer torque limiting positions. During left steer, the pressures in these load signal lines and the hydrostatic differential pressure are reversed.

During steering operation in the normal or permitted torque load range, the centering bias force of biasing springs 278 and 278' and damper springs 284 and 284' is sufficient to overcome either right or left steer hydrostatic differential pressure bias force to retain valve element 262 in the central stroke permit position shown. In the pump stroke permit position, valve element 262 connects right steer signal line 226—through right signal port 291 between lands 262b and c, and through right feed port 293 in sleeve 264, to right steer control line 228 leading from stroke limiter valve 261 to right fluid motor 77, for pump stroke control. The left steer signal line 227 is connected by left steer signal port 292, between lands 262c and d, to left feed port 294 and left steer control line 229 supplying left fluid motor 78. The right and left control ports 296 and 297 are respectively blocked by end lands 262a and e. On movement of valve element 262 in either direction by certain hydrostatic differential pressure values (hereinafter described), the stroke limiter valve 261 controls the pressure in right and left steer control lines 228 and 229 to limit pivotal movement of pump bearing ring 46 from null (N) position and thus limit hydrostatic pump stroke to limit steer torque.

The right pump kidney port 302 of hydrostatic pump 23, having high pressure during right steer, is connected via right load signal line 298 to cup member right chamber 277 of stroke limiter valve 261. The left pump kidney port 302' of the pump 23, having high pressure during left steer, is connected via left load signal line 299 to the left chamber 277'. With right and left chambers 277 and 277' connected through right and left piston passages 288 and 288' to the opposite ends of sleeve bore 263, the hydrostatic differential pressure across the hydrostatic pump 23 is applied to act on the equal end areas of valve element 262 at lands 262e and a. This pressure differential is zero when the hydrostatic pump 23 is at zero stroke, with the hydrostatic system 300 including right and left power transfer passages 301 and 301' supplied with fluid at the charging pressure, hereinafter described in greater detail.

Under normal steer conditions which would not overload the hydrostatic pump 23, the hydrostatic differential pressure of pump 23 acting on valve element 262 is insufficient to overcome the bias force of the opposing one of biasing springs 278, 278', plus the small bias force of the opposing one of damper springs 284, 284', so that the valve element 262 is held in its stroke permit position shown (FIG. 11) to maintain connection of right and left steer signal lines 226 and 227 to deliver control pressure respectively to right and left steer control lines 228 and 229 so as to control pump stroke, and the degree of steer in accordance with steer demand. Under conditions which would overload the steer system, especially hydrostatic pump 23, the higher hydrostatic differential pressure is effective to move the valve element 262 to right or left stroke limiting positions. For example, when the steer valve 223 is controlled by the vehicle operator for right steer to effect right steer movement of right and left stroke control fluid motors 77 and 78 and pump bearing ring 46 toward or to right steer position (RS), which results in fluid flow by hydrostatic pump 23 from left power transfer passage 301' at charging pressure to right power transfer passage 301 at a higher hydrostatic power pressure, and an increase of steer load occurs, the right hydrostatic power pressure increases, the increasing the hydrostatic differential pressure. At maximum torque load, maximum hydrostatic differential pressure overload signal signals that the pump is at the limit of its load capacity. This maximum hydrostatic differential or overload pressure signal is transmitted by right and left load signal lines 298 and 299 to the chambers 277 and 277' to act across the valve element 262. This overload signal urges valve element 262 leftwardly (FIG. 11) to right steer control positions to control the pressure supplied by right steer control line 228 to right fluid motor 77. Under these conditions, right steer signal line 226 and right steer control line 228 normally would be making increasing high control pressure available to right steer control fluid motor 77 for movement or holding by this motor 77 to effect high pump displacement for the steer being demanded. But with the stroke limiter valve element 262 in a first right steer limiting phase, land 262c progressively closes right signal port 291 to reduce fluid flow from right steer signal line 226, and land 262a progressively opens right control port 296 for exhaust fluid flow from right steer control line 228 through right control port 296 and passage 267 to left chamber 277' which is at charging or low main pressure to progressively decrease right steer control pressure in line 228 to low main pressure when right signal port 291 is closed and right control port 296 is open. If this reduction of right steer control pressure in right steer control line 228 does not reduce right power pressure in right power transfer passage 301 and right load signal line 298 below the overload limit value, the continued overload signal will further move value element 262 to a second right steer limiting phase. In this second right steer limiting phase, the high hydrostatic power pressure in right load signal line 298 is delivered via chamber 277 and passage 288 in piston 281 of right biasing assembly 271 and then via passage 268 in valve element 262 and now connected by left feed port 294 to left steer control line 229 and left cylinder 76. With the high right power pressure replacing low main pressure in left cylinder 76 and low main pressure replacing high control pressure in right cylinder 74, left fluid motor 78 will provide a force in addition to the inherent centering force, proportional to pump torque of pump 23 to return pump bearing ring 46 from right steer (RS) position toward null (N) position to reduce right power pressure in right power transfer passage 301 below the overload limit value.

When pump bearing ring 46 is moved in the opposite direction toward left steer (LS) position by left steer control pressure in left fluid motor 78 under the control of steer valve 223 resulting in fluid flow by hydrostatic pump 23 from right power transfer passage 301 to left power transfer passage 301' and the steer load increases to the overload limit of hydrostatic pump 23, the hydrostatic differential pressure of pump 23 is transmitted to the stroke limiter valve 261 to move valve element 262 to left steer (LS) limiting positions, to the right in FIG. 11.

The stroke limiter valve 261 is symmetrical about its center and, in response to similar but opposite left limiting movement, functions in a manner similar to that described above for right steer: to first reduce left steer control pressure in left steer control line 229 to low main pressure and then replace low main pressure in right steer control line 228 with the high left hydrostatic power pressure from left power transfer passage 301', to move pump bearing ring 46 from left steer (LS) position toward null (N) position to reduce left hydrostatic power pressure to the overload limit value. The stroke limiter valve 261 limits the stroke of hydrostatic pump 23 in response to overload to limit steer to less than the steer demanded by the operator to avoid overloading the hydrostatic system. When the differential pressure across the hydrostatic pump 23 decreases to below the overload limit value, the stroke limiter valve element 262 is spring-biased to the stroke permit position shown in FIG. 11 for normal steer control.

Hydrostatic Power Transfer

Referring to FIGS. 1, 2, and 10, with pump bearing ring 46 in the null (N) position shown in FIGS. 2 and 10, the pump 23 does not deliver hydrostatic power pressure for neutral operation, so the entire power transfer passage system 300 is at charging pressure and no power is transferred for steering to provide straight drive. When pump bearing ring 46 is moved to the right steer (RS) position—with pump 23 driven in the direction of pump rotation (Arrow PR, FIG. 2), pump 23 delivers high hydrostatic power pressure through right power transfer passage 301 to motor 23' to drive the motor 23' in the same direction of rotation (Arrow MRRS) for right steer drive. In the left steer (LS) position, pump 23 delivers high hydrostatic power pressure through left power transfer passage 301' to drive motor 23' for motor rotation in the opposite direction (Arrow MRLS) for left steer drive. During right steer operation of pump 23 with pump bearing ring 46 in right steer (RS) position, pump piston and cylinder members 29 and 39 deliver high hydrostatic power pressure via pump rotor ports 32 to right pump kidney port 302 (acting as a delivery port), through right power transfer 301 (formed by four right axial bores 303), to right motor kidney port 304 (acting as an inlet port), to motor rotor ports 32', to motor piston and cylinder members 29' and 39', to drive motor 23' in the direction (Arrow MRRS) for right steer drive.

The left power transfer passage 301' is similar to right power transfer passage 301 described above but is located on the opposite side in pintle 19, as shown in FIGS. 2 and 11, with like numerals (primed).

During right steer operation, motor 23' exhausts hydrostatic fluid at charging pressure via a left kidney port (not shown) acting as an exhaust port to left power transfer passage 301' to left pump kidney port 302' acting as the inlet port. During left steer operation of pump 23, with pump bearing ring 46 in the left steer (LS) position, the hydrostatic power fluid flow is reversed and similarly left power transfer passage 301' delivers high hydrostatic power pressure to drive motor 23' in the opposite direction (Arrow MRLS) for left steer, and right power transfer passage 301 returns power fluid at charging pressure from motor 23' to pump 23.

In low pressure system 160 low pressure supply 166 (FIG. 11) has low mainline 157 and cross-passage 306 for connection to operation support system 325 having charging and lubrication systems 326, 328. Charging system 326 has right and left charging passages 305, 305', respectively having right and left check valves 308, 308', to supply charging fluid at low mainline pressure to the one or both of the right and left charging inlet passages 307, 307', and ports 309 and 309' of power transfer system 300 having hydrostatic charging pressure.

Check valves 308 and 308' prevent return of higher hydrostatic power pressure fluid to low mainline 157. As shown in FIG. 2, right charging port 309 in pintle 19 is formed by cross-bores to connect right charging passage 307 in support wall 16 to all four axial bores 303 which form right power transfer passage 301. The left charging port 309' is formed as one bore to connect left charging passage 307' to all four axial bores 303' which form left power transfer passage 301'. Plugs 310 and 310' close the ends of charging passages 305 and 305', beyond cross-passage 306 at the edge of central support wall 16. Right and left power transfer passages 301 and 301' are respectively connected via right and left charging passages 307 and 307' to right and left power pressure or load signal lines 298 and 299 to supply right and left power pressures which increase above charging pressure respectively in proportion to right and left steer load.

Shuttle Valve

Shuttle valve 311 has a valve element 312 having equal-diameter lands $a$, $b$, and $c$, slidable in a bore 313 between right and left positions limited by respective right and left end walls 316 and 317. Valve element 312 has a passage 318 formed therein connecting the space between lands 312$a$ and $b$ through land $a$ to the end of valve element 312 to supply the chamber 319 located at the left end of bore 313. Valve element 312 has a similar passage 321 connecting the space between lands 312$b$ and $c$ through land $c$ to supply the chamber 322 at the opposite or right end of bore 313. In all positions of valve element 312 right load signal line 298 is connected to the space between lands 312$b$ and $c$ via passage 321 to right end chamber 322. Left load signal line 299 is connected to the space between lands 312$a$ and $b$ via passage 318 to left end chamber 319. During left steer operation, the higher hydrostatic power pressure in left load signal line 299 and in chamber 319 moves valve element 312 against low mainline or charging pressure in chamber 322 to the left steer position shown (FIG. 11), supplying higher left steer hydrostatic pressure as a load signal pressure between lands 312$a$ and $b$ to higher steer pressure line 188, and charging hydrostatic pressure or low steer pressure in right load signal line 298 is connected between lands 312$b$ and $c$ via branch 323 to low steer pressure line 214. Conversely, during right steer operation, the higher right steer pressure in chamber 322 and charging pressure in left end chamber 319 moves valve element 312 to the opposite right steer position connecting the higher hydrostatic power pressure in right load signal line 298 between lands 312$b$ and $c$ to higher steer pressure line 188, and connecting lower hydrostatic power pressure left load signal line 299 via branch 324 to low steer pressure line 214.

Lubrication Supply

Figure 3:
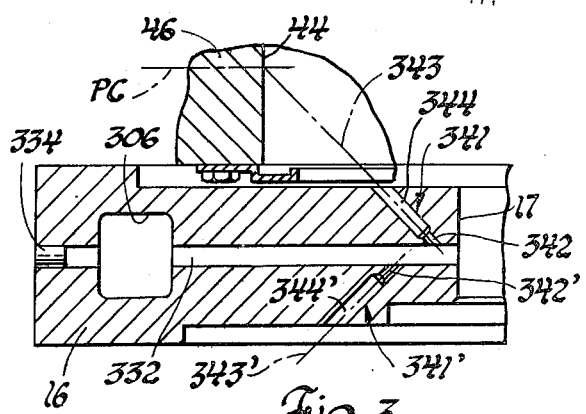
FIG. 3 is an enlarged partial section of FIG. 2, on the line 3—3.

As shown schematically in FIG. 11 and more structurally in FIGS. 2 and 3, low mainline 157 is connected by cross-passage 306 to charging system 326, lubrication system 328, and overage line 176 by connection 327. Regulated low pressure source 156 provides a supply and downstream pressure regulation for the interconnected low mainline 157, overage line 176, and lubrication passage system 328. Thus lubrication system pressure, charging pressure, and overage line pressure are the same as low mainline pressure, and overage fluid is supplied to the lubrication and charging systems 328 and 326 to minimize regulated low pressure source requirements and excess fluid may be returned and exhausted at source 156. Cross-passage 306 is a low pressure fluid connecting part of low pressure system 160 and its subsystems, low pressure supply 166, in which it connects low main and overage lines 157, 176, and operation support system 325 having subsystems, charging system 326, in which it connects to charging passages 305, 305', and lubrication system 328. Overage line 176 supplies fluid under the same pressure via connection 327 at support wall 16 to inlet passage 329 and annular passage 331 around pin 58 for lubrication of pin 58 in bearing bore 59 and connection to cross-passage 306. First and second transverse passages 332 and 333 in support wall 16 intersect and extend transversely relative to cross-passage 306. Plugs 334 and 335 (FIG. 2) seal these passages at the outer edge of central support wall 16. First transverse passage 332 extends in central support wall 16 to the circular opening 17 for supporting pintle 19 for connection (FIGS. 1 and 2) through radial passage 337 in pintle 19 to supply fluid for lubrication to the connected axial passage 338 which is closed at both ends of pintle 19. First transverse passage 332 (FIGS. 2 and 3) has a pump jet opening 341 and a motor jet opening 341'. Pump jet opening 341 has a nozzle 342 located at first transverse passage 332 near the radial inner portion of central support wall 16 and is laterally angled so as to direct a jet stream 343 of fluid for lubricating at a lateral angle (e.g., 45°) through passage 344 and to impinge on pump piston and cylinder members 29 and 39 for their lubrication and cooling, and between pump piston and cylinder members 29 and 39 to impinge on pump internal bearing surface 44 of pump bearing ring 46 at the center, on pump centerline (PC) of internal bearing surface 44 in null (N) position. Motor jet opening 341' similarly has a nozzle 342' similarly located and oppositely laterally angled to direct a jet stream 343' to impinge on motor internal bearing surface 44' of motor bearing ring 46' at the motor centerline.

The second transverse passage 333 has similar pump and motor jet openings 346 and 346' directing jet streams of fluid for lubricating radially outwardly and laterally respectively to the centers of pump and motor internal bearing ring surfaces 44 and 44'. The jet streams impinge on the pump and motor piston and cylinder members 29,29' and 39,39' for lubrication and cooling, and on the pump and motor internal bearing ring surfaces 44 and 44', in their upper quadrants, between the cylinder members 39 and 39', and fluid is retained thereon by annular dams 47 and 47'. Rotation of cylinder members propels or moves oil beyond or ahead of the cylinder members 39 and 39' as the members rotate around the entire perimeters of the respective pump and motor internal bearing ring surfaces 44 and 44' for the above-described hydrodynamic lubrication components 139 and 139' of hybrid bearings 45 and 45'.

Lubricating fluid supplied to axial passage 338 is also connected by pump and motor restricted radial feed passages 347 and 347' to lubricate the pump and motor rotor internal bearings 27 and 27' on pump and motor bearings 28 and 28' on pintle 19. Pump rotor internal bearing 27 has, at opposite side edges, internal annular grooves 348 and 349 to collect hydrostatic leakage fluid and to distribute this leakage fluid for lubrication. Pump radial feed passage 347 is connected to and supplies fluid to annular groove 348. Annular grooves 348 and 349 are connected by passages 351 and 352 to a nozzle 353 formed integrally in or attached to pump rotor 24 centrally between each of the piston members 29 to provide a jet stream of fluid impinging on internal bearing ring surface 44 between each of the cylinder members 39 for a supplemental or alternative feed of the pump hydrodynamic bearing component 139 employing hydrostatic leakage fluid and lubrication supply fluid. The motor rotor internal bearing 27' has similar annular grooves 348' and 349' connected by passages to a nozzle (not shown) to similarly provide a lubrication fluid jet stream impinging on motor internal bearing ring surface 44'.

OPERATION

When the engine is running and driving the transmission input drive 91, the regulated low pressure source 156, which includes a pump and downstream regulator, is driven to supply low mainline pressure regulated at a low pressure (e.g., 150 psi) to low mainline 157, and at least one of first and second pumps 158 or 159 is driven to supply high mainline pressure to high mainline 161. The primary regulator valve 164 regulates high mainline pressure in high mainline 161 in a high pressure range (e.g., 400 to 1800 psi) proportional to high hydrostatic power pressure, and connects the overage fluid flow to overage line 176. Since overage line 176 is connected to the lubrication passage system 328 and to low mainline 157, these lines have regulated low mainline pressure. Low mainline 157 and at times overage line 176 supply lubrication passage system 328 and, through check valves 308 and 308', charge power transfer passage system 300, so hydrostatic transmission 10 is operative for null and steer drive operation. When low mainline pressure for charging and lubrication is normal, the secondary regulator valve 165 connects high mainline 161 to control pressure line 168 to supply manual steer valve 223 so hydraulic steer controls 155 are operative.

When there is no steer demand steer valve 223 is in null (N) position, so hydraulic steer controls 155 position pump bearing ring 46 in null (N) position for straight drive operation. In the power transfer passage system 300, since pump 23 is not pumping, the right and left power transfer passages 301 and 301' respectively have right and left hydrostatic power pressure equal to the charging pressure, which is low mainline pressure. During right and left steer drive operation the respective one of the right and left hydrostatic power pressures increases from low mainline charging pressure to a maximum (e.g., 150 to 4000 psi) with increasing steer torque load, while the other pressure remains at or below low mainline or charging pressure. The shuttle valve 311 supplies the higher hydrostatic power pressure to higher steer pressure line 188 and the low hydrostatic charging pressure to low steer pressure line 214.

In response to steer demand by movement of steer lever 247 toward or to right or left steer (RS) or (LS) demand position, on opposite sides of null (N) position, steer valve 223 controls the supply of control pressure from control pressure line 168 respectively to right and left steer signal lines 226 and 227 which, in the normal steer torque load range, are freely connected by stroke limiter valve 261 to right and left steer control lines 228 and 229 supplying right and left fluid motors 77 and 78 to position pump bearing ring 46 in right and left steer drive (RS) and (LS) positions on opposite sides of null (N) position corresponding to the steer demand position of steer lever 247.

The primary regulator valve 164 has a constant bias force provided by overage and low mainline pressures which is equal to that of regulated low mainline pressure value and by spring 177 to regulate a minimum high mainline pressure (e.g., 400 psi), as the high hydrostatic power pressure in high steer pressure line 188 increases in a low range up to a low value (e.g., 200 psi), and to regulate high mainline pressure increasing from the minimum to a maximum pressure (e.g., 400 to 1800 psi), in proportion to the increase of high hydrostatic power pressure from the low to a maximum pressure value (e.g., 150 to 4000 psi). Thus high mainline pressure provides a control pressure acting in fluid motors 77 and 78 to control pump stroke meeting, but not significantly exceeding, stroke control force requirements which increase with pump torque load and high hydrostatic power pressure to minimize parasitic power loss.

The secondary regulator valve 165 is controlled by the low charging hydrostatic power pressure in low steer pressure line 214 acting on low steer pressure actuator 206. Secondary regulator valve 165 normally connects high mainline pressure in high mainline 161 to control pressure line 168 when the lower hydrostatic power pressure in the right or left power transfer passages 301 and 301' is above the normal operating minimum pressure value (e.g., 80 psi) for normal operation of the charging system and hydrostatic and hydrodynamic lubrication systems of pump 23 and motor 23'. In the normal operating range of low hydrostatic power pressure values from the regulated low mainline pressure value (e.g., 150 psi), to the normal operating minimum pressure value (e.g., 80 psi), permits normal transient pressure variation, due to normal high flow requirements variation relative to supply capacity, with sufficient low mainline pressure and fluid flow for proper charging and lubrication, and sufficient high mainline pressure for proper stroke control up to maximum high hydrostatic pressure and load limited by stroke limiter valve 261.

Abnormal conditions (e.g., severe load, high temperature, or damage) in hydrostatic transmission 10 may cause leakage at a rate abnormally higher than the supply rate capacity of low pressure source 156 and overage resulting in a further reduction of low hydrostatic pressure in an abnormal operating range. When the lower pressure of the right and left hydrostatic pressures in power transfer passages 301 and 301' decreases in the abnormal operating range from the normal operating minimum pressure value to a minimum operating pressure value, steer control pressure and thus pump torque load capacity is proportionately reduced to zero. The lower or charging hydrostatic power pressure is connected from one of power transfer passages 301 or 301' and connected right or left load signal lines 298 or 299 having the lower hydrostatic power pressure by shuttle valve 311 to low steer pressure line 214 to control the secondary regulator valve 165 to proportionately reduce or limit control pressure in control pressure line 168 from the high mainline pressure value regulated by the primary regulator valve 164 to zero as lower or charging hydrostatic power pressure decreases from the normal operating minimum pressure value to a minimum operating pressure value (e.g., 80 to 30 psi). This reduction of control pressure in the abnormal operating range reduces the capacity of the steer controls to control pump stroke to provide high values of high hydrostatic power pressure, so the high hydrostatic power pressure and load is limited or reduced. This reduction or limitation of high hydrostatic power pressure will reduce the degree of steer response relative to the degree of steer demand or degree of steer operation and advise the operator that low hydrostatic power pressure, charging pressure, and lubrication pressure are low (in the abnormal) range), and that steer demand has been excessive or service is required. This reduction of control pressure reduces high hydrostatic power pressure and load capacity so that the reduced charging and lubrication pressures are sufficient for proper operation, especially at this reduced load. If excess steer demand and resultant high temperature caused the abnormal low hydrostatic power pressure, operation at reduced load will reduce leakage and temperature, so low hydrostatic power pressure will increase to the normal range. This control pressure reduction, when due to a service-related problem, is normally gradual and permits limited load and degree steering operation for a considerable time for vehicle retrieval. When low power passage pressure is below the minimum pressure value (e.g., 30 psi), there are insufficient charging and lubrication pressures for proper operation of hydrostatic transmission 10, so the control pressure is reduced to zero to abort operation of or unload hydrostatic transmission 10.

For straight drive, steer valve 223, in straight drive or null (N) position, positions pump bearing ring 46 in null (N) position so hydrostatic transmission 10 is in neutral, with the variable displacement pump 23 in zero stroke position. In the straight drive or null (N) position of steer valve 223, steer valve element 246 is manually positioned in null (N) position, and servo valve element 231 is positioned in null (N) position by link 239 connected to pump bearing ring 46 in null (N) position to connect control pressure line 168 to both the right and left steer signal lines 226 and 227. Since steer valve 223 is an open-center valve connecting, through a clearance, the right and left steer signal lines 226 and 227 to control pressure line 168 and exhaust 255, the right and left steer signal pressure values are equal and about one-half of the control pressure value. Thus, with equal pressure in right and left fluid motors 77 and 78 and the inherent self-centering forces of pump 23 on pump bearing ring 46, the pump bearing ring is held in the null (N) position for zero stroke. Right and left power transfer passages 301 and 301', charging passages 307 and 307', connected load signal lines 298 and 299, high and low steer pressure lines 188 and 214, and the lubrication passage system 328, all are supplied by low mainline 157 and overage line 176 and thus have low mainline pressure, e.g., 150 psi. Control pressure in control pressure line 168 will be regulated by primary regulator valve 164 at minimum pressure value, e.g., 400 psi.

When the vehicle operator moves manual steer lever 247 from the null (N) position to any right steer demand position, including full right steer demand (RS) position, steer valve element 246 is similarly rotated to connect control pressure line 168 to supply full control pressure to right steer signal line 226 and to exhaust left steer signal line 227, connected via stroke limiter valve 261 and respectively right and left steer control lines 228 and 229 to cylinders 74 and 76 of right and left fluid motors 77 and 78, to move pump bearing ring 46 from null (N) position toward or to maximum right steer (RS) position to increase right steer stroke of pump 23. Then pump 23 pumps fluid to increase hydrostatic power pressure in right power transfer passage 301 to drive motor 23' to meet right steer requirements. This higher hydrostatic power pressure, connected via right load signal line 298, shuttle valve 311, and high steer pressure line 188, controls primary regulator valve 164 to increase high mainline and control pressures to meet pump stroke control requirements. Pump bearing ring 46 is connected by the link 239 and steer lever 247 to rotate servo valve element 231 to the same degree as manual steer valve element 246 in response to the degree of stroke change demanded. When pump bearing ring 46 reaches the demanded stroke position, up to the maximum stroke (RS) position servo valve element 231 catches up with manual steer valve element 246 to provide a steer-hold position which, like null (N) position, provides control pressure to both right and left steer signal lines 226 and 227 and the fluid motors 77 and 78 having a sufficient pressure differential to balance the pump load reaction on pump bearing ring 46 to hold pump bearing ring 46 in the demanded stroke position.

For left steer drive, the steer lever 247 is moved from null (N) position toward or to full left steer (LS) position—depending on the degree of steer demand, and these controls similarly provide the demanded degree of left steer drive.

As pointed out above, if the demanded degree of steer drive results in a torque overload on pump 23, the stroke limiter valve 261 controls the right and left steer control pressures delivered to right and left steer control lines 228 and 229 to limit pump stroke and thus steer torque to the rated torque capacity of pump 23 and hydrostatic transmission 10.

In the operation of hydrostatic transmission 10, pump 23 first rotates at low starting speeds while it is unloaded and has about charging hydrostatic power pressure. Then as pump speed increases to higher running speeds, the higher hydrostatic power pressure increases to higher pressure values with the drive torque load. During coast, the higher hydrostatic power pressure may be reduced to the charging pressure. Overrun drive will reverse the charging and higher hydrostatic power pressures in right and left power transfer passages 301 and 30' of the power transfer passage system 300.

In pump 23, the hybrid bearing 45 between each slipper bearing 41 and bearing ring 46 has a lubrication system having a hydrostatic component 138—the parts or portions thereof functioning to bleed hydrostatic power pressure to provide hydrostatic lubrication fluid flow and balancing pressure both increasing with hydrostatic power pressure or load, and a hydrodynamic component 139—the parts or portions thereof functioning to utilize a low pressure fluid supply to provide hydrodynamic lubrication fluid flow and balancing pressure, both increasing with speed.

In pump hydrostatic component 138, hydrostatic power pressure fluid from the cylinder chamber 42 is supplied through restricted port 141 to the distribution recess 142. Distribution recess is a narrow recess, centrally located and longitudinally extending substantially from the leading end 146 to the trailing end 147 in the slipper bearing surface 43, and peripherally spaced, only by the fluid film thickness or running clearance 145, from the internal bearing ring surface 44 so as to retain hydrostatic fluid in the recess 142 substantially at hydrostatic power pressure. Hydrostatic power pressure fluid flows as a fluid film between slipper bearing surface and internal bearing surface 44 to provide hydrostatic balancing pressure decreasing from hydrostatic power pressure at recess 142 to zero at the side edges (Curve Hs, FIG. 8).

The hydrostatic fluid flow and balancing pressure are small and only sufficient to meet low hydrostatic lubrication fluid flow and balancing pressure requirements at starting speeds with the pump unloaded and having charging hydrostatic power pressure. In pump 23, speed increases before hydrostatic power pressure increases, therefore both the hydrostatic and hydrodynamic components 138 and 139 coact during running speed operation. The restricted port 141 and the area of slipper bearing surface 43 are small so that, in response to increasing hydrostatic power pressure, the hydrostatic balancing pressure increases to provide a high portion (90% to 95%), but not all, of these requirements.

Pump hydrodynamic component 139 employs the low pressure fluid supply from low mainline 157 and pump jet openings 341 and 346 to spray fluid on the upper quadrant of internal bearing surface 44 of pump bearing ring 46 for hydrodynamic lubrication. Annular dams 49 on each side of pump bearing ring 46 retain a body of fluid on internal bearing surface 44 between pump slipper bearings 41 having a depth about 5 times greater than the height of entrance portion 154. Pump slipper bearing 41 has, during rotation of pump 23 in the direction in which edge 151 is the leading edge, a leading taper 148 extending and decreasing in height from leading edge 151 to leading end 146 of slipper bearing surface 43, to provide a wedge-shaped injection space 150 between leading taper 148 and internal bearing surface 44. Injection space 150 has a height, between internal bearing surface 44 and leading taper 148 at entrance portion 154 at leading edge 151, greater than, about 5 times, the fluid free film thickness and a height diminishing to bearing running clearance 145 at leading end 146. Each rotating slipper bearing 41 rotates a body of fluid, and taper 148 injects fluid from the body with hydrostatic flow and balancing pressure into bearing clearance 145 between slipper and internal bearing surfaces 43 and 44. Since distribution recess 142 is narrow, hydrodynamic fluid is injected over substantially all (90% to 95%) of the width of leading edge 151 and acts on substantially all of the area of slipper bearing surface 43. The hydrostatic balancing pressure in clearance 145 is low near leading end 146 due to rotation, and near the side edges due to the pressure gradient, so hydrodynamic flow enters clearance 145. The hydrodynamic fluid flow and balancing pressure increase in proportion to running speed to meet the hydrodynamic requirements and the remainder of the hydrostatic requirements. The hydrodynamic flow and balancing pressure coact with the hydrostatic flow and balancing pressure to reduce hydrostatic fluid flow to increase total flow and balancing pressure with speed and load to meet these requirements of hybrid bearing 45.

Lubrication fluid flow requirements increase with hydrostatic pressure and speed. The restricted port 141 is small so it supplies hydrostatic lubrication fluid flow under hydrostatic pressure only sufficient to meet the small lubrication fluid flow requirements at low starting speeds when pump 23 is unloaded. As speed and hydrostatic balancing pressure increase, the hydrostatic balancing pressure has an increased effect to confine and reduce hydrostatic lubrication fluid flow. As load increases, the running clearance, and thus hydrostatic fluid flow, is reduced. Hydrodynamic fluid flow increases to meet hydrodynamic flow requirements and the remainder of hydrostatic flow requirements, and thus total flow requirements. A minimum amount of hydrostatic power fluid is bled for hydrostatic lubrication fluid flow, especially at high running speeds and/or high power operation, to minimize parasitic power loss. The hydrodynamic lubrication system is supplied from the low mainline 157 at low pressure so the parasitic power loss is minimized. The hydrostatic and hydrodynamic balancing pressures additively coact to provide a higher total balancing pressure so a smaller area slipper bearing is used for higher efficiency. The hydrodynamic balancing pressure provides the major fluid flow balancing force and the hydrostatic balancing pressure provides the minor fluid flow and balancing force at running speeds. The average of the high speed hydrodynamic balancing pressure gradient (Curve Hd, FIG. 8) is greater than the average of the high load hydrostatic balancing pressure gradient (Curve Hs, FIG. 8).

The operation and structure of motor 23' are similar to that described above relative to pump 23, thus only the differences therebetween are pointed out below. Motor 23' is initially supplied with high hydrostatic power pressure for starting and operation at starting speeds under load. In motor hybrid bearing 45' the hydrostatic component 138' must meet hydrostatic or total flow and balancing pressure requirements at all loads and low starting speeds. Thus in motor hydrostatic component 138' the distribution recess 142' is a larger and wider square central distribution recess with a larger area to balance all loads at starting speeds and to balance a decreasing portion of the hydrostatic load with increasing running speeds.

As motor speed increases in the running speed range, hydrodynamic balancing pressure increases and acts on the smaller bearing area at the sides of recess 142' to balance the hydrodynamic load and an increasing portion of the hydrostatic load or the remainder not balanced by hydrostatic balancing pressure. In motor 23' hydrostatic balancing pressure provides the major balancing force, while hydrodynamic balancing pressure provides the minor balancing force at high speed and loads. As in pump hybrid bearing 45, in motor hybrid bearing 45' hydrostatic lubricant flow is limited by restricted port 141' to meet low starting speed requirements and is reduced as hydrodynamic lubricant fluid flow increases with increasing running speeds, and as increasing load reduces clearance 145'. Hydrodynamic flow increases to meet hydrodynamic requirements and the remainder of hydrostatic requirements to meet total lubricant flow requirements. This construction of motor hybrid bearing 45' provides optimum motor efficiency.

It will be appreciated that modifications of the invention may be made.

The embodiments of the invention for which an exclusive property or privilege is claimed are defined in the following claims:

1. In a radial hydrostatic machine having a housing; a rotor rotatably mounted in said housing; a bearing ring mounted on said housing and having an internal bearing positionable eccentric to said rotor; a plurality of pairs of piston members and cylinder members with each pair providing a hydrostatic chamber; each of said pairs having one member mounted on said rotor and the other member having a slipper bearing supported on said internal bearing; hydrostatic fluid transfer means having an inlet and an outlet alternately connected to and providing hydrostatic pressure in said hydrostatic chambers during rotation of said rotor for hydromechanical torque transfer and providing on said slipper bearings a hydrostatic load proportional to hydrostatic pressure and a hydrodynamic load proportional to the speed of said rotor; the improvement comprising hybrid bearing means for each slipper bearing having an internal bearing surface on said internal bearing and a slipper bearing surface on said slipper bearing with a clearance therebetween for running bearing oil film support on said internal bearing surface; a hydrostatic component having a recess centrally in said slipper bearing surface with said clearance on both sides of said recess, a restricted port connecting said hydrostatic chamber to said recess and laterally to said clearance for hydrostatic fluid flow and balancing pressure increasing with hydrostatic pressure; and a hydrodynamic component having low pressure fluid supply means for maintaining a body of fluid on said internal bearing surface between said slipper bearings with a height larger than the free film thickness of the fluid, and a taper at the leading edge of said slipper bearings providing an injection wedge space with an entrance having a height larger than said free film thickness and gradually diminishing to said clearance for injecting hydrodynamic fluid into said clearance with a hydrodynamic fluid flow and balancing pressure increasing with speed and coacting with hydrostatic flow and balancing pressure to decrease hydrostatic fluid flow and providing increased total flow and balancing pressure balancing hydrodynamic load and hydrostatic load to meet total fluid flow and balancing pressure requirements of said hybrid bearing at all speeds.

2. The invention defined in claim 1, and the width of said recess being not more than ten percent of the width of said slipper bearing surface so said hydrodynamic component provides a major portion of said fluid flow and balancing pressure at higher speeds.

3. The invention defined in claim 1, and the height of said entrance being about five times the free film thickness of the fluid.

4. The invention defined in claim 3, and said low pressure fluid supply means including means for spraying fluid on said members for lubrication and cooling and between said pairs of members on said internal bearing surface, and annular dams on each side of said internal bearing retaining fluid on said internal bearing surface at said leading edge to a depth of about five times the height of said entrance.

5. In a radial hydrostatic machine having a housing; a rotor rotatably mounted in said housing; a bearing ring mounted on said housing and having an internal bearing positionable eccentric to said rotor; a plurality of pairs of piston members and cylinder members with each pair providing a hydrostatic chamber; each of said pairs having one member mounted on said rotor and the other member having a slipper bearing supported on said internal bearing; hydrostatic fluid transfer means having an inlet and an outlet alternately connected to and providing hydrostatic pressure in said hydrostatic chambers during rotation of said rotor for hydromechanical torque transfer and providing on said slipper bearings a hydrostatic load proportional to hydrostatic pressure and a hydrodynamic load proportional to the speed of said rotor; the improvement comprising hybrid bearing means for each slipper bearing having an internal bearing surface on said internal bearing and a slipper bearing surface on said slipper bearing with a clearance therebetween for running bearing oil film support on said internal bearing surface; a hydrostatic component having a recess centrally in said slipper bearing surface with said clearance on both sides of said recess, a restricted port connecting said hydrostatic chamber to said recess and laterally to said clearance for hydrostatic fluid flow and hydrostatic balancing pressure increasing with hydrostatic pressure to meet at low speeds, and provide a portion but not all at high speeds, of the flow and balancing pressure requirements of said hydrostatic load; and a hydrodynamic component having a taper at the leading edge of said slipper bearing providing an injection wedge space with an entrance having a height larger than the free film thickness of the fluid and gradually diminishing to said clearance, and low pressure fluid supply means for maintaining a body of fluid on the internal bearing surface between said slipper bearings with a height larger than the height of said entrance for injecting hydrodynamic fluid into said clearance with hydrostatic flow and balancing pressure increasing with speed and coacting to decrease hydostatic fluid flow and providing hydrodynamic fluid flow and balancing pressure to meet hydrodynamic load and the remainder of hydrostatic load flow and balancing pressure requirements at high speeds so total fluid flow and balancing pressure meet hydbrid bearing requirements at all speeds.

6. In a radial hydrostatic machine having a housing; a rotor rotatably mounted in said housing; a bearing ring mounted on said housing and having an internal bearing positionable eccentric to said rotor; a plurality of pairs of piston members and cylinder members with each pair providing a hydrostatic chamber; each of said pairs having one member mounted on said rotor and the other member having a slipper bearing supported on said internal bearing; hydrostatic fluid transfer means having an inlet port and an outlet port and alternately connecting hydrostatic pressure between said inlet and outlet ports and said hydrostatic chambers during rotation of said rotor for hydromechanical torque transfer and providing on said slipper bearings a hydrostatic load proportional to hydrostatic pressure and a hydrodynamic load proportional to the speed of said rotor; the improvement comprising hybrid bearing means for each slipper bearing having an internal bearing surface on said internal bearing and a slipper bearing surface on said slipper bearing with a clearance therebetween for running bearing clearance engagement with said internal bearing surface; a hydrostatic component having a recess centrally in said slipper bearing surface with said clearance on both sides of said recess, a restricted port connecting said hydrostatic chamber to said recess and laterally to said clearance for hydrostatic fluid flow increasing with hydrostatic pressure to provide a portion of hydrostatic flow requirements and provide hydrostatic balancing pressure increasing with hydrostatic pressure to balance a portion of said hydrostatic load; and a hydrodynamic component having a taper at the leading edge of said slipper bearing providing an injection wedge space with an entrance having a height larger than the free film thickness of the fluid and gradually diminishing to said clearance, and low pressure fluid supply means for maintaining a body of fluid on the internal bearing surface between said slipper bearings with a height larger than the height of said entrance for injecting hydrodynamic fluid into said clearance with a flow increasing with speed and acting to decrease hydrostatic fluid flow to provide hydrostatic flow requirements and remaining hydrostatic flow requirements at high speeds, and providing hydrodynamic balancing pressure balancing hydrodynamic load and the remainder of hydrostatic load at high speeds so total fluid flow and balancing pressure meet hybrid bearing requirements at all speeds.

7. In a radial hydrostatic machine having a housing; a rotor rotatably mounted in said housing; a bearing ring mounted on said housing and having an internal bearing positionable eccentric to said rotor; a plurlaity of pairs of piston members and cylinder members with each pair providing a hydrostatic chamber; each of said pairs having one member mounted on said rotor and the other member having a slipper bearing supported on said internal bearing; hydrostatic fluid transfer means having an inlet port and an outlet port and alternately connecting hydrostatic pressure between said inlet and outlet ports and said hydrostatic chambers during rotation of said rotor for hydromechanical torque transfer and providing on said slipper bearings a hydrostatic load proportional to hydrostatic pressure and a hydrodynamic load proportional to the speed of said rotor; the improvement comprising hybrid bearing means for each slipper bearing having an internal bearing surface on said internal bearing and a slipper bearing surface on said slipper bearings with a clearance therebetween for running bearing oil film support on said internal bearing surface; a hydrostatic component having a recess centrally in said slipper bearing surface with said clearance on both sides of said recess, a restricted port connecting said hydrostatic chamber to said recess and laterally to said clearance for hydrostatic fluid flow increasing with hydrostatic pressure to provide a portion of hydrostatic flow requirements and provide hydrostatic balancing pressure increasing with hydrostatic pressure to balance a portion of said hydrostatic load; and a hydrodynamic component having a taper at the leading edge of said slipper bearing providing an injection wedge space with an entrance having a height several times the height of the free film thickness of the fluid and gradually diminishing to said clearance, and low pressure fluid supply means for maintaining a body of fluid on the internal bearing surface between said slipper bearings with a height several times the height of said entrance for injecting fluid into said clearance with a hydrodynamic flow increasing with speed and acting to decrease hydrostatic fluid flow and providing hydrodynamic balancing pressure substantially balancing said hydrodynamic load and the remainder of hydrostatic load so total fluid flow and balancing pressure meets hybrid bearing requirements.

8. In a radial hydrostatic machine having a housing; a rotor rotatably mounted in said housing; a bearing ring mounted on said housing and having an internal bearing positionable eccentric to said rotor; a plurality of pairs of piston members and cylinder members with each pair providing a hydrostatic chamber; each of said pairs having one member mounted on said rotor and the other member having a slipper bearing supported on said internal bearing; hydrostatic fluid transfer means having an inlet port and an outlet port alternately connecting hydrostatic pressure between said inlet and outlet ports and said hydrostatic chambers during rotation of said rotor for hydromechanical torque transfer and providing on said slipper bearings a hydrostatic load proportional to hydrostatic pressure and a hydrodynamic load proportional to the speed of said rotor; the improvement comprising hybrid bearing means for each slipper bearing having an internal bearing surface on said internal bearing and a slipper bearing surface on said slipper bearings with a clearance therebetween for running bearing oil film support on said internal bearing surface; a hydrostatic component having a recess centrally in said slipper bearing surface with said clearance on both sides of said recess, a restricted port connecting said hydrostatic chamber to said recess and laterally to said clearance for hydrostatic fluid flow increasing with hydrostatic pressure to, at low speeds, provide all and, at high speeds, provide a portion but not all of hydrostatic flow requirements and provide hydrostatic balancing pressure increasing with hydrostatic pressure to balance, at low speeds, all and, at high speeds, a high portion but not all of said hydrostatic load; and a hydrodynamic component having a taper at the leading edge of said slipper bearing providing an injection wedge space with an entrance having a height several times the free film thickness of the fluid and gradually diminishing to said clearance, and low pressure fluid supply means for maintaining a body of fluid on the internal bearing surface between said slipper bearings with a height several times the height of said entrance for injecting fluid into said clearance with a hydrodynamic fluid flow increasing with speed and acting to decrease hydrostatic fluid flow, to meet hydrodynamic flow requirements and the remainder of hydrostatic flow requirements at high speeds, and providing hydrodynamic balancing pressure balancing said hydrodynamic load and the remainder of said hydrostatic load at high speeds so total fluid flow and balancing pressure meets hybrid bearing requirements at all speeds.

9. In a radial hydrostatic machine having a housing; a rotor rotatably mounted in said housing; a bearing ring mounted on said housing and having an internal bearing positionable eccentric to said rotor; a plurality of pairs of piston members and cylinder members with each pair providing a hydrostatic chamber; each of said pairs having one member mounted on said rotor and the other member having a slipper bearing supported on said internal bearing; hydrostatic fluid transfer means having an inlet port and an outlet port and alternately connecting hydrostatic pressure between said inlet and outlet ports and said hydrostatic chambers during rotation of said rotor for hydromechanical torque transfer and providing on said slipper bearings a hydrostatic load proportional to hydrostatic pressure and a hydrodynamic load proportional to the speed of said rotor; the improvement comprising hybrid bearing means for each slipper bearing having an internal bearing surface on said internal bearing and a slipper bearing surface on said slipper bearing with a clearance therebetween for running bearing oil film support on said internal bearing surface; a hydrostatic component having a recess centrally in said slipper bearing surface with said clearance on both sides of said recess, a restricted port connecting said hydrostatic chamber to said recess and laterally to said clearance for hydrostatic fluid flow and hydrostatic balancing pressure increasing with hydrostatic pressure to provide a portion but not all of flow and balancing pressure requirements of said hydrostatic load at high speeds; and a hydrodynamic component having a taper at the leading edge of said slipper bearing providing an injection wedge space with an entrance having a height several times larger than said free film thickness and gradually diminishing to said clearance, and low pressure fluid supply means including a nozzle to spray fluid radially outwardly and laterally onto said internal bearing surface, and annular dams at each side of said internal bearing for maintaining a body of fluid on the internal bearing surface between said slipper bearings with a height several times the height of said entrance for injecting hydrodynamic fluid longitudinally into said clearance between said slipper bearing surface and internal bearing surface on both sides of said recess with a flow increasing with speed and acting to decrease hydrostatic fluid flow and providing hydrodynamic fluid flow and balancing pressure to meet hydrodynamic load and the remainder of hydrostatic load flow and balancing pressure requirements at running speeds so total fluid flow and balancing pressure meets hybrid bearing requirements at all speeds.

10. In a radial hydrostatic machine for operation from low starting speeds to higher running speeds having a housing; a rotor rotatably mounted in said housing; a bearing ring mounted on said housing and having an internal bearing positionable eccentric to said rotor; a plurality of pairs of piston members and cylinder members with each pair providing a hydrostatic chamber; each of said pairs having one member mounted on said rotor and the other member having a slipper bearing supported on said internal bearing; hydrostatic fluid transfer means having an inlet port and an outlet port and alternately connecting charging and high hydrostatic pressure between said inlet and outlet ports and said hydrostatic chambers during rotation of said rotor for hydromechanical torque transfer and providing on said slipper bearings a hydrostatic load proportional to hydrostatic pressure and a hydrodynamic load proportional to the speed of said rotor; and a low pressure source supplying charging pressure to said hydrostatic fluid transfer means; the improvement comprising hybrid bearing means for each slipper bearing having an internal bearing surface on said internal bearing and a slipper bearing surface on said slipper bearings with a clearance therebetween for running bearing oil film support on said internal bearing surface; a hydrostatic component having a recess centrally in said slipper bearing surface with said clearance on both lateral sides of said recess, a restricted port connecting said hydrostatic chamber to said recess and laterally to said clearance for hydrostatic fluid flow and balancing pressure increasing with hydrostatic pressure to provide at low starting speeds all, and at higher running speeds a portion but not all of the flow and balancing pressure requirements; and a hydrodynamic component having a taper at the leading edge of said slipper bearing providing an injection wedge space with an entrance having a height several times the free film thickness of the fluid and gradually diminishing to said clearance, and supply means for supplying fluid from said low pressure source and for maintaining a body of fluid on said internal bearing surface between said slipper bearings with a height several times the height of said entrance for injecting hydrodynamic fluid longitudinally into said clearance between said slipper bearing surface and internal bearing surface on both sides of said recess with a flow increasing with said higher running speeds and acting to decrease hydrostatic fluid flow and providing hydrodynamic flow and balancing pressure to meet the flow and balancing pressure requirements of said hydrodynamic load and the remainder of said hydrostatic load so total fluid flow and balancing pressure meets hybrid bearing requirements at all speeds.

11. The invention defined in claim 10, in a radial hydrostatic machine of the pump type where operation at starting speeds occurs under charging hydrostatic pressure and at running speeds occurs under charging and high hydrostatic pressure; said hydrostatic component providing hydrostatic fluid flow increasing hydrostatic pressure to provide all of the flow requirements for said hydrostatic load at charging hydrostatic pressure at starting speeds, a high portion but not all of the flow requirements for hydrostatic loads at running speeds, and a hydrostatic balancing pressure increasing with high hydrostatic pressure to balance all of said hydrostatic load at charging hydrostatic pressure at starting speeds, and a high portion but not all of said hydrostatic load at running speeds; and said hydrodynamic component providing hydrodynamic fluid flow increasing with speed and acting to decrease hydrostatic fluid flow at running speeds and meeting the hydrodynamic fluid flow requirements and the remainder of hydrostatic fluid flow requirements at running speeds, and providing hydrodynamic balancing pressure meeting said hydrodynamic load and the remainder of said hydrostatic load at running speeds.

12. The invention defined in claim 10, in a radial hydrostatic machine of the motor type where operation under charging and high hydrostatic pressure occurs at low starting speeds and running speeds; said hydrostatic component providing hydrostatic fluid flow increasing with hydrostatic pressure to provide all of the flow requirements for said hydrostatic load at all hydrostatic pressures at starting speeds, and a high portion but not all of the flow requirements for said hydrostatic load at running speeds, and a hydrostatic balancing pressure increasing with hydrostatic pressure to balance all of said hydrostatic load at all hydrostatic pressures at starting speeds, and a high portion but not all of said hydrostatic load at running speeds; and said hydrodynamic component providing hydrodynamic fluid flow increasing with speed and acting to decrease hydrostatic fluid flow at running speeds, and meeting the hydrodynamic fluid flow requirements and the remainder of hydrostatic fluid flow requirements at running speeds, and providing hydrodynamic balancing pressure meeting said hydrodynamic load and the remainder of said hydrostatic load at running speeds.

* * * * *